United States Patent
Dixon et al.

(10) Patent No.: US 10,556,266 B2
(45) Date of Patent: Feb. 11, 2020

(54) SLIDING ADJUSTABLE TOGGLE CLAMP

(71) Applicant: The Boeing Company, Chicago, IL (US)

(72) Inventors: Robert Dean Dixon, Everett, WA (US); William Ryan Cooper, Marysville, WA (US); Zachary David Talus, Seattle, WA (US); Christopher E. Plass, Monroe, WA (US); Lane W. Fuglevand, Seattle, WA (US); Ronald Steven Hetzel, Everett, WA (US); Dennis R. Johnson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/351,216

(22) Filed: Mar. 12, 2019

(65) Prior Publication Data

US 2019/0210095 A1     Jul. 11, 2019

Related U.S. Application Data

(62) Division of application No. 15/236,139, filed on Aug. 12, 2016, now Pat. No. 10,265,760.

(51) Int. Cl.
*B23B 35/00* (2006.01)
*B23B 41/00* (2006.01)
*B21J 15/14* (2006.01)

(52) U.S. Cl.
CPC ............ *B21J 15/142* (2013.01); *B23B 35/00* (2013.01); *B23B 41/006* (2013.01);
(Continued)

(58) Field of Classification Search
CPC ... B23B 41/006; B23B 35/00; B23B 2215/04; B23B 47/284; B23B 2260/118;
(Continued)

(56) References Cited

U.S. PATENT DOCUMENTS

| 4,662,556 A | 5/1987 | Gidlund |
| 4,885,836 A * | 12/1989 | Bonomi .................. B21J 15/10 |
| | | 29/524.1 |

(Continued)

OTHER PUBLICATIONS

Office Action, dated Jul. 12, 2018, regarding U.S. Appl. No. 15/236,139, 16 pages.
(Continued)

*Primary Examiner* — Ryan C Rufo
(74) *Attorney, Agent, or Firm* — Yee & Associates, P.C.

(57) ABSTRACT

A tool including a pair of rails is attachable to the inside surface of the skin panel. A housing is pivotally and slidably connected between the pair of rails. The housing is pivotable about a first axis and is slidable along grooves in the pair of rails. The housing has a first end and a second end opposite each other. The tool includes a rod having a third end and a fourth end, the third end attached to and extending from the first end of the housing. The tool also includes a pressure foot attached to the fourth end of the housing. The pressure foot includes a curved ankle integrally formed with a flat flange, the curved ankle curving into the flat flange. The pressure foot is configured to apply pressure along a portion of the inside surface of the skin panel when the housing is in a vertical position.

20 Claims, 25 Drawing Sheets

(52) U.S. Cl.
CPC ..... *B23B 2215/04* (2013.01); *B23B 2260/118* (2013.01); *B23B 2270/08* (2013.01); *B23B 2270/20* (2013.01)

(58) Field of Classification Search
CPC ............. B23B 2270/62; B23B 2270/20; Y10T 408/5623; Y10T 408/56238; Y10T 408/56253; Y10T 408/56245; B21J 15/42; B21J 15/142
See application file for complete search history.

(56) References Cited

U.S. PATENT DOCUMENTS

| | | | |
|---|---|---|---|
| 4,967,947 A | | 3/1990 | Sarh |
| 5,560,102 A | * | 10/1996 | Micale ................... B23P 21/00 29/407.1 |
| 6,073,326 A | | 6/2000 | Banks et al. |
| 6,098,260 A | | 8/2000 | Sarh |
| 6,172,374 B1 | | 1/2001 | Banks et al. |
| 6,413,022 B1 | | 7/2002 | Sarh |
| 6,430,796 B1 | | 8/2002 | Jones et al. |
| 7,137,760 B2 | | 11/2006 | Boyl-Davis et al. |
| 8,365,376 B2 | * | 2/2013 | Reid ........................ B21J 15/14 254/93 R |
| 8,914,979 B2 | * | 12/2014 | Venskus ................. B23Q 1/012 29/281.1 |
| 9,162,332 B2 | | 10/2015 | Wright et al. |
| 9,259,779 B2 | | 2/2016 | Sarh et al. |
| 9,610,693 B2 | * | 4/2017 | Sarh ........................ B21J 15/142 |
| 9,962,834 B2 | | 5/2018 | Stone et al. |
| 2002/0050043 A1 | * | 5/2002 | Sarh ........................ B21J 15/10 29/407.01 |
| 2006/0039765 A1 | | 2/2006 | Hamann |
| 2007/0274797 A1 | | 11/2007 | Panczuk et al. |
| 2018/0043438 A1 | | 2/2018 | Dixon et al. |

OTHER PUBLICATIONS

Notice of Allowance, dated Dec. 11, 2018, regarding U.S. Appl. No. 15/236,139, 10 pages.

* cited by examiner

SLIDING ADJUSTABLE TOGGLE CLAMP

CROSS-REFERENCE TO RELATED APPLICATION

This application is a divisional application of U.S. application Ser. No. 15/236,139 filed Aug. 12, 2016, issued a Notice of Allowance on Dec. 11, 2018, and issued as U.S. Pat. No. 10,265,760 on Apr. 23, 2019, which is incorporated herein by reference.

BACKGROUND INFORMATION

1. Field

This disclosure relates to systems and methods for applying pressure to skins of an aircraft during drilling operations when manufacturing the aircraft.

2. Background

Many skin panels are riveted together when manufacturing aircraft, using many rivets. Even two skin panels may be riveted using six thousand rivets or more. The process of riveting generally starts with pressing two skin panels together tightly at the location of a drill site, drilling a hole through both skin panels, and then driving a rivet through the hole. This process is repeated for each rivet.

Pressing the skin panels together tightly is important so that burs, flash, or other inconsistencies are not formed on one or both skin panels during drilling. If such inconsistencies form, then the skin panels are separated, the holes are cleared of the inconsistencies in a process known as de-burring, and then the skin panels are aligned and put back together again for riveting. However, this process wastes time and resources, so it is preferable to avoid the inconsistencies in the first place by tightly pressing the skin panels together during drilling.

To increase the speed of this procedure, pairs of robots work together on opposite sides of the skin panels to press the skin panels together, drill the hole, and then drive the rivet through the hole. However, due to protruding features such as frames and stringers formed on the inside surfaces of the skin panels, space for the robots may be limited in certain areas on the inside surface of the skin panel. Thus, the robot or robots operating on the inside side of the skin panels will have insufficient space to operate properly in these areas.

Therefore, it would be desirable to have a method and apparatus that take into account at least some of the issues discussed above, as well as other possible issues. Specifically, one issue is to find a method and apparatus for applying pressure to areas of the inside surface of a skin panel where space is limited so that a robot on the opposite side of the skin panel can drill rivet holes without creating inconsistencies. Another issue is to find a method and apparatus for quickly moving the pressure-applying device from hole location to hole location to increase the speed of the riveting operation.

SUMMARY

An illustrative embodiment of the present disclosure provides for a tool for applying pressure to an inside surface of a skin panel of an aircraft. The tool includes a pair of rails attachable to the inside surface of the skin panel. The tool also includes a housing pivotally and slidably connected to the pair of rails between facing inside surfaces of the pair of rails such that the housing is pivotable about a first axis defined between the facing inside surfaces of the pair of rails and through the housing, and such that the housing is slidable along the grooves of the pair of rails. The housing has a first end and a second end opposite each other relative to the pair of rails. The tool also includes a rod having a third end and a fourth end, the third end attached to and extending from the first end of the housing. The tool also includes a pressure foot attached to the fourth end of the rod. The pressure foot includes a curved ankle integrally formed with a flat flange, the curved ankle curving into the flat flange. The pressure foot is configured to apply pressure along a portion of the inside surface of the skin panel when the housing is in a vertical position relative to the inside surface of the skin panel.

The advantageous embodiments also provide for a method for manufacturing an aircraft using a tool comprising a pair of rails attachable to an inside surface of a first skin panel. The housing is pivotally and slidably connected to the pair of rails between facing inside surfaces of the pair of rails such that the housing is pivotable about a first axis defined between the facing inside surfaces of the pair of rails and through the housing, and such that the housing is slidable along the grooves of the pair of rails. The housing has a first end and a second end opposite each other relative to the pair of rails. The tool also includes a rod having a third end and a fourth end, the third end attached to and extending from the first end of the housing. The tool also includes a pressure foot attached to the fourth end of the rod, the pressure foot comprising a curved ankle integrally formed with a flat flange. The curved ankle curves into the flat flange. The pressure foot is configured to apply pressure along a portion of the inside surface of the first skin panel when the housing is in a vertical position relative to the inside surface of the first skin panel. Using this tool, the method includes bringing together the first skin panel and a second skin panel. The method also includes attaching the pair of rails to the inside surface of the first skin panel. The method also includes applying a backing force to the second skin panel. The method also includes pivoting the housing until the pressure foot applies pressure against the inside surface of the first skin panel against the backing force.

The advantageous embodiments also provide for a manually operated clamp capable of being in position along a rail, for use in the fabrication and assembly of aircraft stow bins. The clamp includes a sliding pivot positionable along a rail. The clamp also includes a lever attached to said pivot comprising a first end including a hand grip and a second end including a clamp foot. Said foot remains in a stationary position and applies a force to a workpiece when the lever is positioned so that the direction of said force is generally normal to said rail.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments may recognize and take into account one or more different considerations. For example, the illustrative embodiments recognize and take into account that burs, flash, or other inconsistencies may arise when two or more skin panels are brought together and then a hole drilled through the skin panels. Thus, the advantageous embodiments provide for a temporary back-up reaction force load restraint to an aircraft skin lap joint surface in opposition to manufacturing process loads sufficiently to eliminate secondary process de-burring of associated drilled holes.

The advantageous embodiments also provide for a contact length adjustable rocking toggle clamp shoe supported equidistant between a rectangular framework incorporating guided linear bearing mounts. This design provides for the toggle clamp mechanism to slide along the rail frame until in a specific location along the rail.

The frame rail assembly is indexed and locked in location with associated vacuum suction cups to a predetermined surface seam. The clamp foot is slid in position along the rail. In position, the clamp foot is swung out pivoting and rotating about the contact shoe contour while applying an increasing load in relation to the cam pivot angular relationship. Load sensors within the foot mechanism indicate applied loading corresponding to a manual adjustment to the overall length of the foot to axis pivot to an external indicator.

Thus, the advantageous embodiments provide for a method and apparatus providing a temporary back-up reaction force load restraint to a metallic skin lap joint surface in opposition to manufacturing process loads. A contact length adjustable rocking toggle clamp shoe is supported equidistant between a rectangular framework. The advantageous embodiments include incorporated guided linear bearing mounts provides for the toggle clamp mechanism to slide along the rail frame to a specific location.

The frame rail assembly is indexed and locked in location with vacuum suction cups about a predetermined surface seam. A clamp foot is slid in position along the rail and is manually swung out pivoting and rotating about the contact shoe contour applying an increasing load in relation to the cam pivot angular relationship. A clamp foot mechanism incorporating load sensors within in the foot mechanism indicates an applied loading corresponding to a prior manual adjustment to the overall length of the foot to axis pivot. Thus, the advantageous embodiments provide for a clamp foot mechanism incorporating load sensors within the foot mechanism relaying loads to an external indicator. The advantageous embodiments may be further varied.

Figure 1:
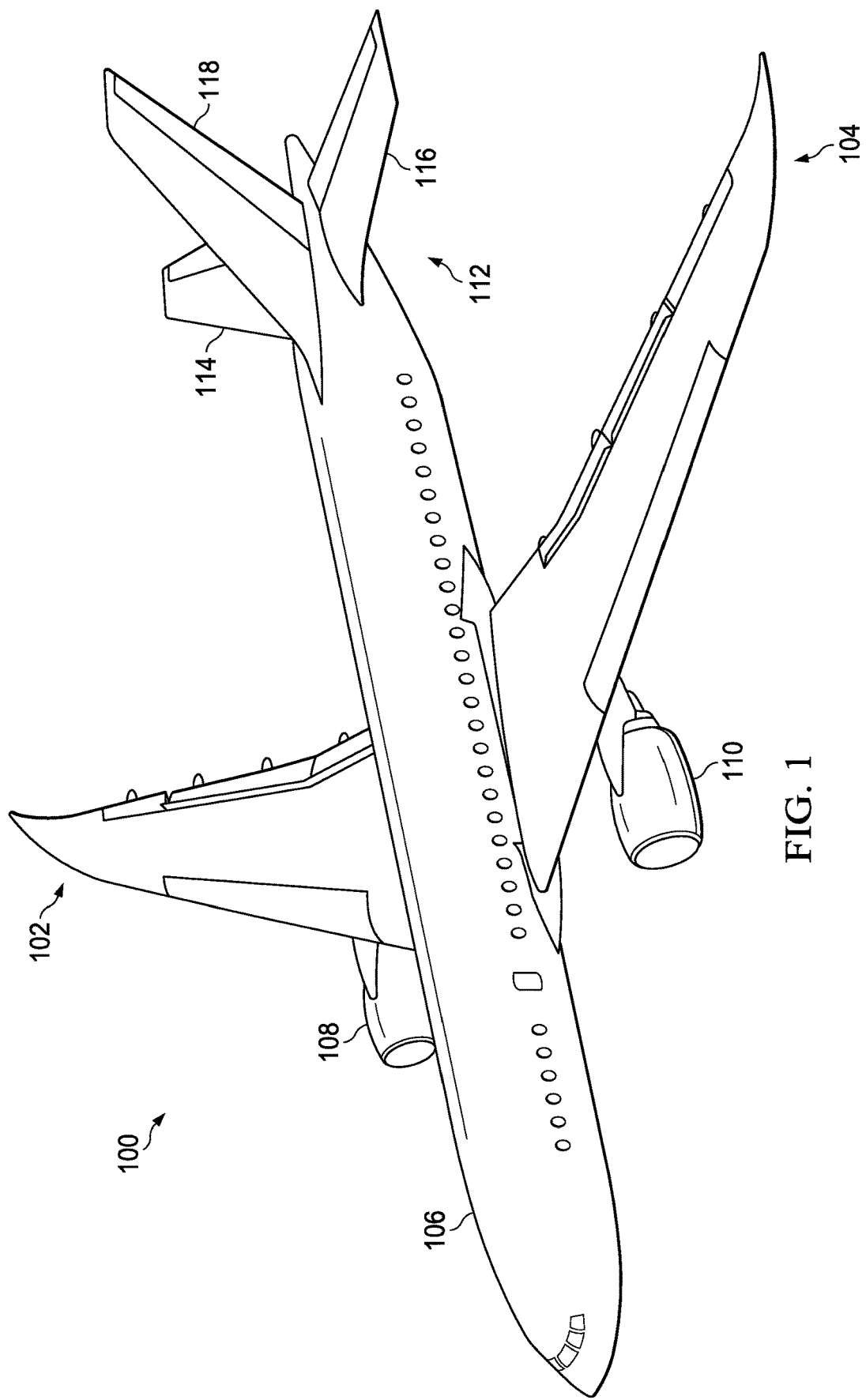
FIG. 1 illustrates an aircraft, in accordance with an illustrative embodiment.

FIG. 1 illustrates an aircraft, in accordance with an illustrative embodiment. Aircraft 100 includes wing 102 and wing 104 attached to fuselage 106; engine 108 attached to wing 102; and engine 110 attached to wing 104. Fuselage 106 has tail section 112. Horizontal stabilizer 114, horizontal stabilizer 116, and vertical stabilizer 118 are attached to tail section 112 of fuselage 106.

Figure 2:
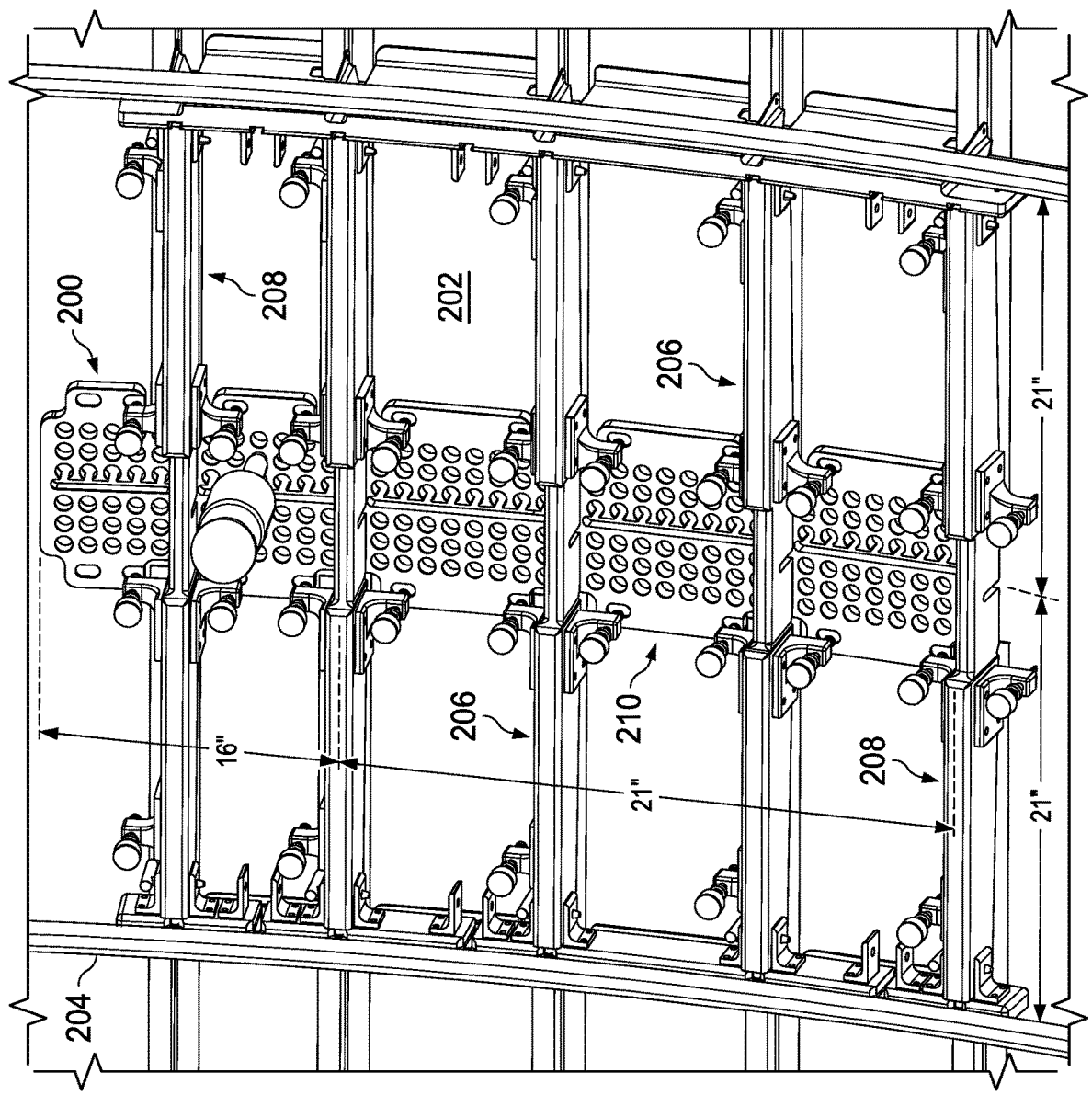
FIG. 2 illustrates a technique for applying pressure to the inside surface of a pair of skin panels brought together for drilling and riveting, the technique using a drilling template, in accordance with an illustrative embodiment.

FIG. 2 illustrates a technique for applying pressure to the inside surface of a pair of skin panels brought together for drilling and riveting, the technique using a drilling template, in accordance with an illustrative embodiment. FIG. 2 shows an inside surface of skin panel 202, which forms part of a fuselage, such as fuselage 106 of FIG. 1. The inside surface of skin panel 202 includes obstructions which interfere with a working on the inside surface of skin panel 202. These obstructions include, for example, frame 204 and stringer 206.

Typically, another robot on the opposite side of skin panel 202 works in tandem with the robot operating on the inside surface of skin panel 202. When these robots work together, they provide the desired force pressing against each other to ensure that the skin panels (including skin panel 202) are pressed together tightly to prevent burs during drilling through the skin panels. However, frame 204 and stringer 206 interfere with operation of the robot operating on the inside surface. Nevertheless, pressure is still to be applied against the inside surface of skin panel 202 against pressure applied by the robot on the outside surface (not shown).

One technique usable to apply pressure to the inside surface of skin panel 202 is to attach template 200 to the inside surface of skin panel 202. Rails or tooling 208 may support template 200, being attached to both skin panel 202 and to frame 204 and/or stringer 206. Pattern of holes 210 is provided in template 200. Pattern of holes 210 match the locations where holes are to be drilled in skin panel 202 and likewise where rivets are to be subsequently driven. The force applied by rails or tooling 208 to template 200 provides the desired back force to be applied against the counter force applied by the robot on the outside surface of skin panel 202.

A first disadvantage to using template 200 is that a specific template is usually tooled or created for each individual space between frames or stringers which the inside robot has difficulty reaching. In some cases, a unique tool is created for a specific area of a specific aircraft. The time and expense of designing and forming custom templates is not desirable.

A second disadvantage to using template 200 is that often significant time is spent installing template and rails or tooling 208. This time expended is also expensive and not desirable.

Figure 3:
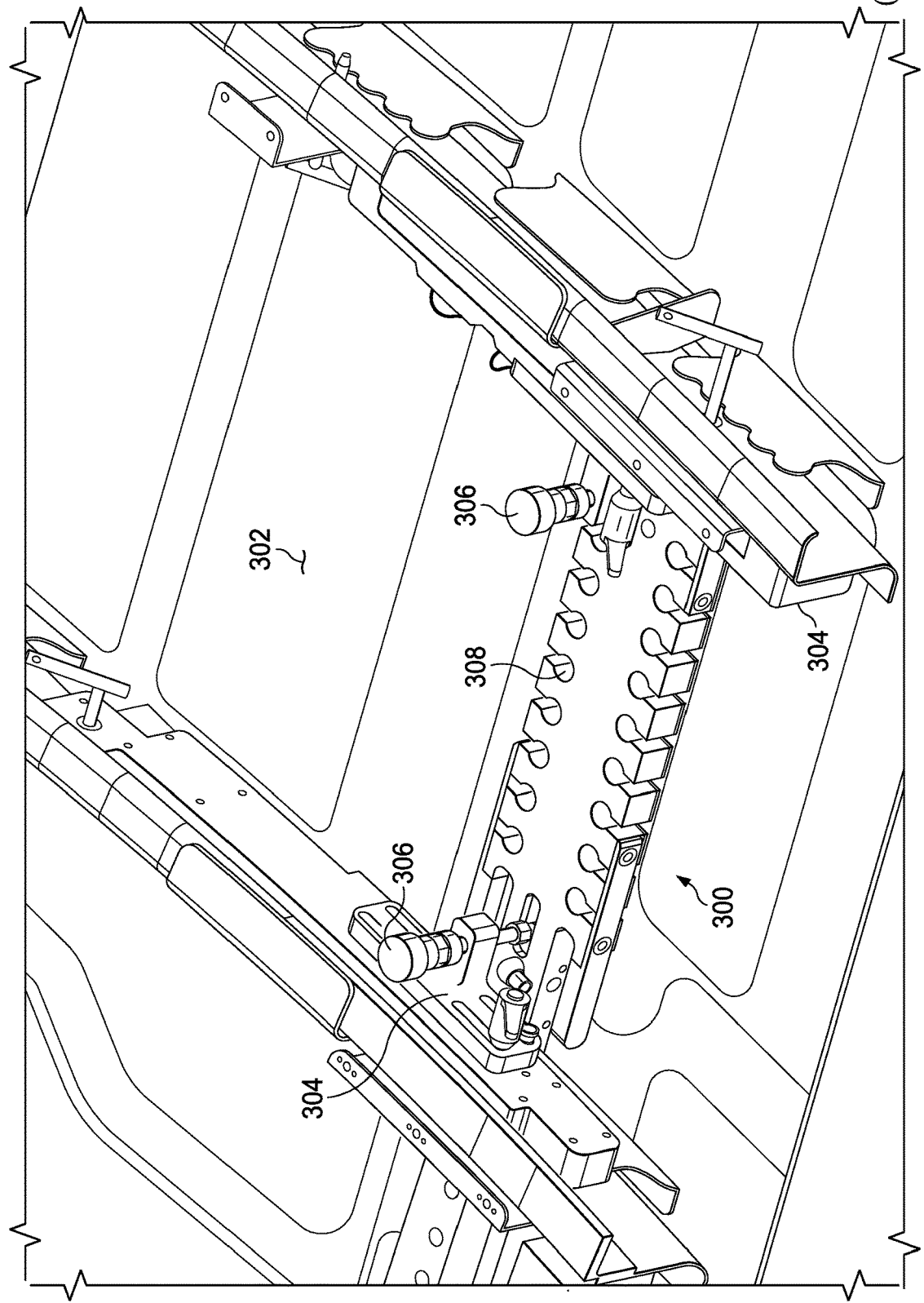
FIG. 3 illustrates a technique for applying pressure to the inside surface of a pair of skin panels brought together for drilling and riveting, the technique using another drilling template, in accordance with an illustrative embodiment.

FIG. 3 illustrates a technique for applying pressure to the inside surface of a pair of skin panels brought together for drilling and riveting, the technique using another drilling template, in accordance with an illustrative embodiment. The technique described with respect to FIG. 3 is similar to that shown in FIG. 2, in that template 300 is used to apply pressure to the inside surface of skin panel 302.

Again, rails or tooling 304 is attached to frames 306 of skin panel 302. Rails or tooling 304 secure template 300 against skin panel 302. Frames 306 in rails or tooling 304 may be turned to increase or decrease the force applied by template 300 to skin panel 302. Pattern of holes 308 in template 300 are presented through which holes are drilled in skin panel 302.

A first disadvantage to using template 300 is that a specific template is usually tooled or created for each individual space between frames or stringers which the inside robot has difficulty reaching. In some cases, a unique tool is created for a specific area of a specific aircraft. The time and expense of designing and forming custom templates is not desirable.

A second disadvantage to using template 300 is that often significant time is spent installing template 300 and rails or tooling 304. This time expended is also expensive and not desirable.

FIG. 4 through FIG. 21 illustrate the use of a sliding adjustable toggle clamp with a rail system for holding the sliding adjustable toggle clamp. FIG. 4 through FIG. 21 illustrate the same devices from different perspectives in order to show the operation of the system. Thus, FIG. 4 through FIG. 21 share common reference numerals that refer to the same objects having the same functions. More particularly, FIG. 4 through FIG. 7 show placement and indexing of the rail system used with the sliding adjustable toggle clamp. FIG. 8 through FIG. 17 show use of the sliding adjustable toggle clamp. FIG. 18 through FIG. 21 show alternative designs for the sliding adjustable toggle clamp. Attention is now turned to the individual figures.

Figure 4:
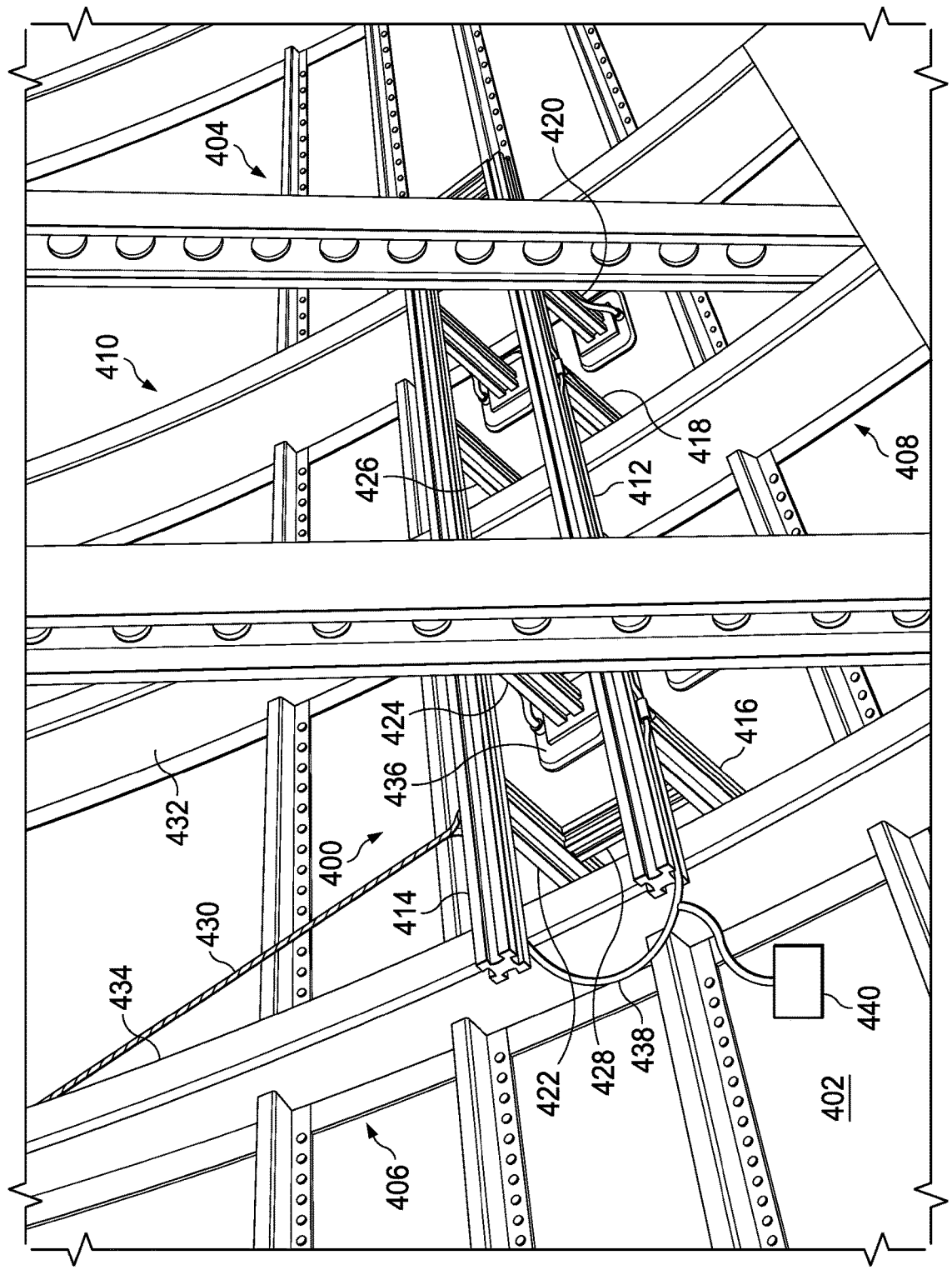
FIG. 4 illustrates placement of a rail system for a sliding adjustable toggle clamp, in accordance with an illustrative embodiment.

FIG. 4 illustrates placement of a rail system for a sliding adjustable toggle clamp, in accordance with an illustrative embodiment. Initially, rail system 400 is placed on skin 402 of fuselage 404. Although rail system 400 is shown being placed manually by a technician, rail system 400 could be placed automatically by a robot. As can be seen from FIG. 4, space for operating a riveting robot is limited on portions of skin 402 due to the presence of frames, such as frame 406, frame 408, and frame 410.

Rail system 400 includes a pair of rails, rail 412 and rail 414. One or more legs extend from rail 412 and rail 414 for resting rail system 400 on skin 402. In this illustrative embodiment, six legs are present, three for each rail. Thus, shown are leg 416, leg 418, and leg 420, all extending from rail 412, as well as leg 422, leg 424, and leg 426, all extending from rail 414. More or fewer legs may be present. Cross beams, such as cross beam 428, may be added to connect pairs of legs together for additional reinforcement of rail system 400.

Rail system 400 includes flexible object 430, which is used to connect rail system 400 to a frame, such as frame 406, to a stringer, such as stringer 432, stringer 434, or some other object on skin 402. Flexible object 430 may be a rope, string, line, cord, bungee cord, tubing, strap, or any other like object. Flexible object 430 may be fixedly attached to rail system 400, or may be attached to a cord housing with a retractable spring, which is attached to rail system 400. Thus, in an illustrative embodiment, flexible object 430 may be wrapped up in the cord housing when not in use. A second flexible object, similar to flexible object 430, may be disposed on the opposite side of rail system 400 so that rail system 400 may be balanced solely by use of the flexible objects. More or fewer flexible objects may be present in other advantageous embodiments.

Additionally, flanges, such as flange 436, are attached to the ends of each of the legs. In an illustrative embodiment, not all legs need to have flanges. The flanges will act to grip skin 402 once a vacuum is applied inside the flanges. In effect, the flanges act as suction cups to firmly lock rail system 400 in place on the surface of skin 402. The flanges may be made from rubber, though any material suitable for use in suction cups or vacuum applications may be used.

Rail system 400 also includes tubing 438. Tubing 438 extends into rail 412 and rail 414, though in other advantageous embodiments tubing 438 may run along or below these rails. Wherever tubing 438 runs with respect to rail system 400, the tubing establishes fluid communication between vacuum source 440 and spaces inside the flanges, such as flange 436.

In use, as shown in FIG. 4, rail system 400 is secured to skin 402. In an illustrative embodiment, two different methods are used to secure rail system 400 to skin 402, though more or fewer techniques could be used. Thus, either or both of flexible object 430 and flanges, such as flange 436, may be optional in some advantageous embodiments. If neither technique is used, then a technician or a robot could simply hold rail system 400 in place while in use. Nevertheless, as shown in FIG. 4, two securing mechanisms are used to secure Rail system 400 to skin 402.

Initially, rail system 400 is secured to skin 402 by connecting flexible object 430 to a frame, such as frame 406, to a stringer, such as stringer 434, or some other object on skin 402. If a second or additional flexible object is provided, these may also be attached to the same or different frames, stringers, or some other objects on skin 402.

Next, vacuum source 440 is connected to tubing 438. When vacuum source 440 is actuated, a vacuum is established inside the flanges on the ends of the legs, such as inside flange 436 of leg 424. The vacuum creates pressure seals inside the flanges, thus securing the legs and hence rail system 400 to the surface of skin 402.

Figure 5:
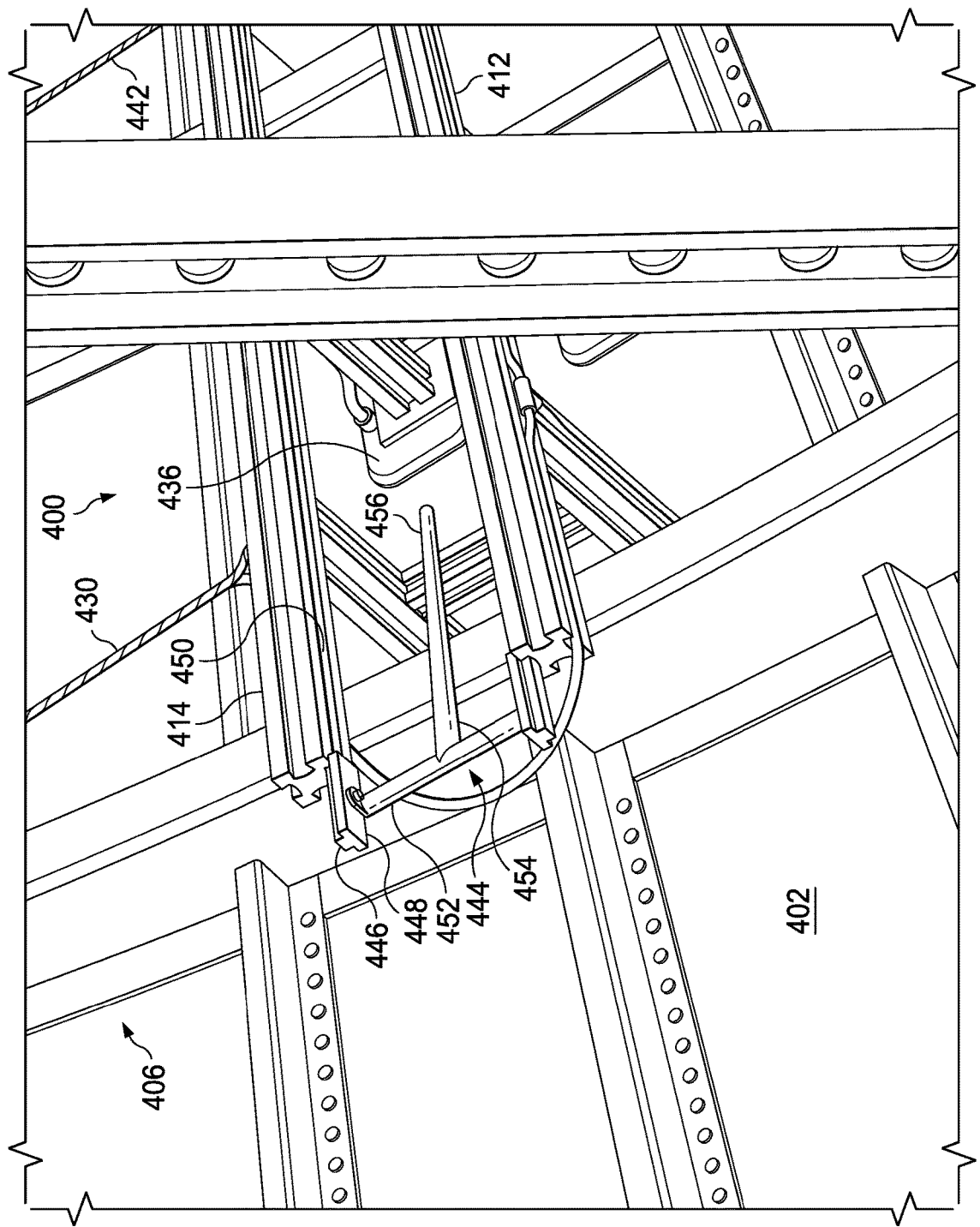
FIG. 5 illustrates a first step for indexing a rail system for a sliding adjustable toggle clamp, in accordance with an illustrative embodiment.

FIG. 5 illustrates a first step for indexing a rail system for a sliding adjustable toggle clamp, in accordance with an illustrative embodiment. Indexing, as used herein, is the process of aligning rail system 400 along a row of rivets or along a row where holes for rivets will be drilled in skin 402. FIG. 5 represents an optional intermediate step between securing rail system 400 to skin 402 using flexible object 430 and securing rail system 400 to skin 402 using vacuum source 440.

As shown in FIG. 5, two flexible objects are initially used to suspend rail system 400 from frames or stringers, flexible object 430 and flexible object 442. When rail system 400 is placed manually, doing so frees up the technician's hands so that the technician may perform the following indexing operations.

After rail system 400 is suspended, indexing device 444 is connected to rail system 400. Optionally, indexing device 444 may have already been installed on rail system 400. Indexing device 444 may be attached to rail system 400 by use of projections on mounts, such as projection 446 protruding from mount 448, placed on either side of indexing device 444. The projections slide into grooves in the rails, such as groove 450 in rail 414. Indexing device 444 is then slid along and between the pair of rails until indexing device 444 reaches a desired location, as described with respect to FIG. 6 and FIG. 7.

Indexing device 444 also includes cross beam 452 from which leg 454 extends, at a right angle as shown in this example. Cross beam 452 is pivotably attached to the mounts, such as mount 448, so that cross beam 452 may rotate about the long axis of cross beam 452. Indexing foot 456 is attached to the end of leg 454. Indexing foot 456 is used in the process of indexing rail system 400, as described further below with respect to FIG. 6 and FIG. 7. During the indexing process, rail system 400 may be adjusted up and down or side to side with respect to skin 402 during the indexing process so that rail system 400 is placed precisely where desired. Thereafter, vacuum source 440 is actuated, securing rail system 400 in precisely the desired location.

Figure 6:
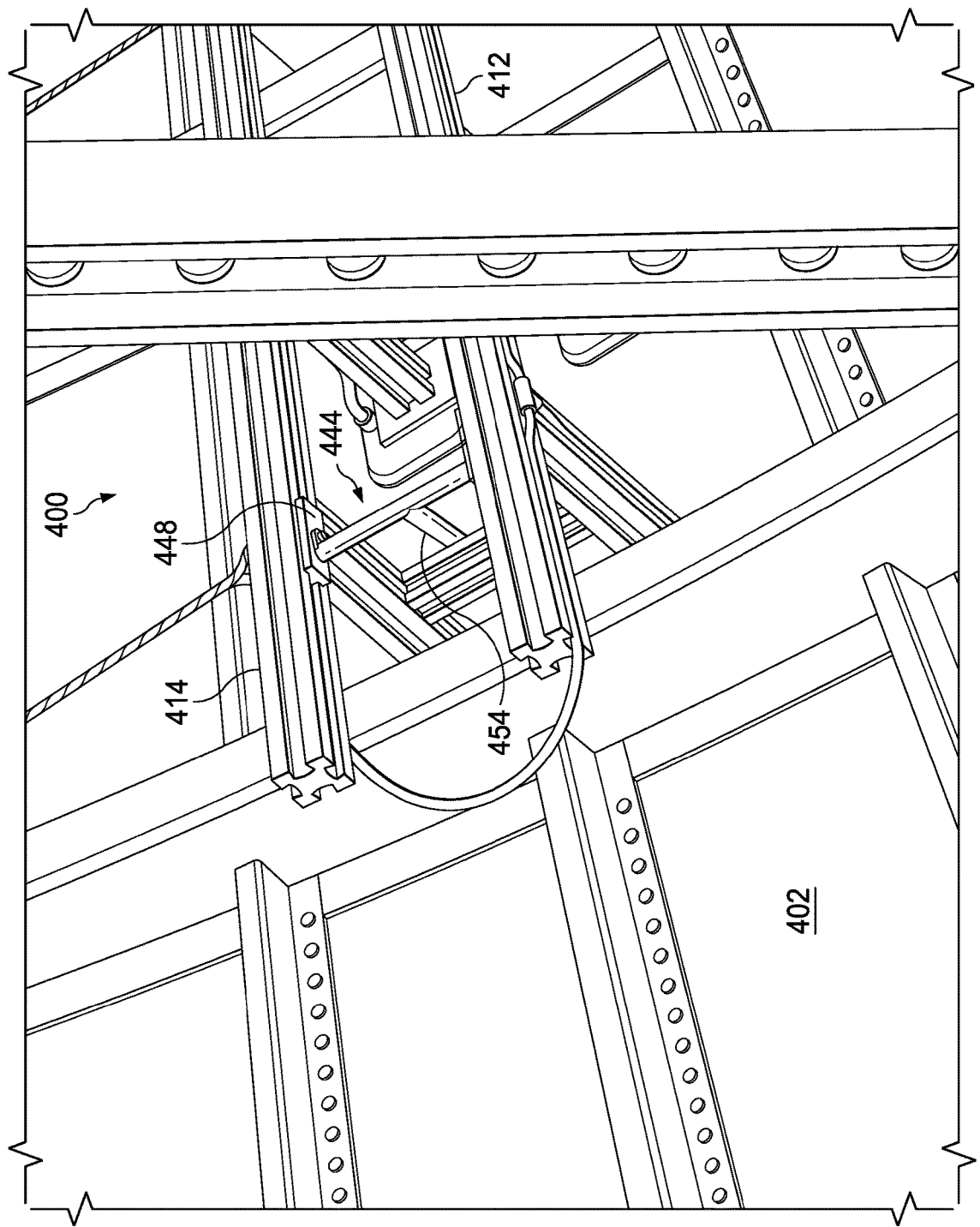
FIG. 6 illustrates a second step for indexing a rail system for a sliding adjustable toggle clamp, in accordance with an illustrative embodiment.

FIG. 6 illustrates a second step for indexing a rail system for a sliding adjustable toggle clamp, in accordance with an illustrative embodiment. FIG. 5 showed indexing device 444 being installed between the rails of rail system 400. FIG. 6 shows indexing device 444 slid further along between rail 412 and rail 414. Additionally, FIG. 6 shows that leg 454 of indexing device 444 has been pivoted downwardly with respect to a height of rail 412 and rail 414 above skin 402.

Figure 7:
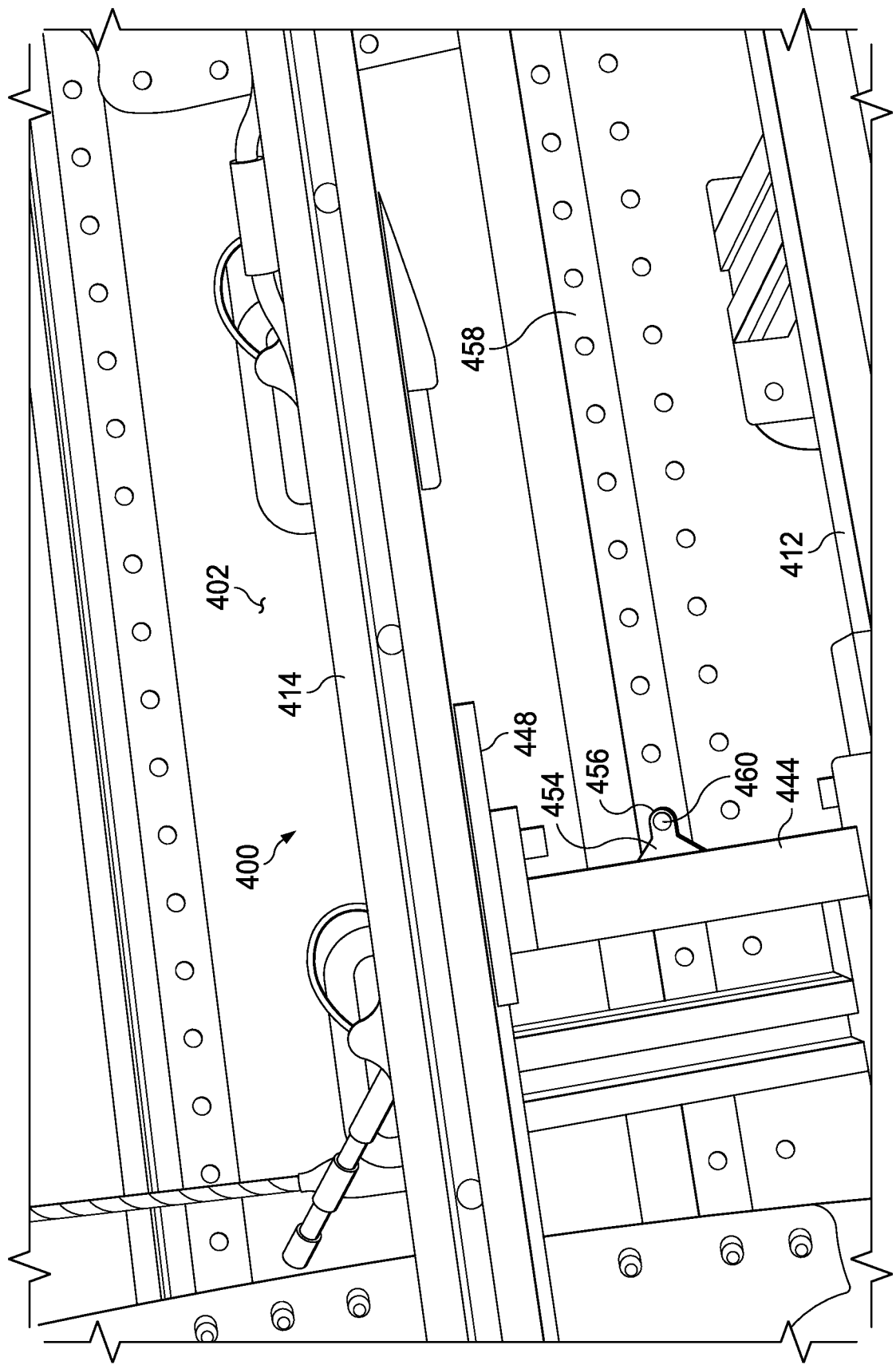
FIG. 7 illustrates a third step for indexing a rail system for a sliding adjustable toggle clamp, in accordance with an illustrative embodiment.

FIG. 7 illustrates a third step for indexing a rail system for a sliding adjustable toggle clamp, in accordance with an illustrative embodiment. FIG. 7 shows a different perspective, as viewed from straight over indexing device 444. Relative to the position shown in FIG. 6, indexing device 444 is now pivoted such that leg 454 is in a vertical position relative to skin 402.

Indexing foot 456 is now shown disposed over row 458. Row 458 may be a row of rivets, or a row of marks indicating where holes are to be drilled in skin 402. If marks are not used, indexing foot 456 is placed in an initial location where a future row of holes is to be drilled in skin 402. In the illustrative embodiment shown in FIG. 7, indexing foot 456 is placed over first mark 460. A hole in indexing foot 456 allows a technician to visualize when the hole in indexing foot 456 is aligned with first mark 460. To effect this alignment, rail system 400 may be adjusted back and forth or up and down, or a combination thereof, until the hole in indexing foot 456 is aligned with first mark 460.

After this initial alignment has been completed, indexing device 444 is pivoted upwardly away from skin 402 and then slid along rail 412 and rail 414. At least one other alignment position is then taken, as described with respect to FIG. 8.

Figure 8:
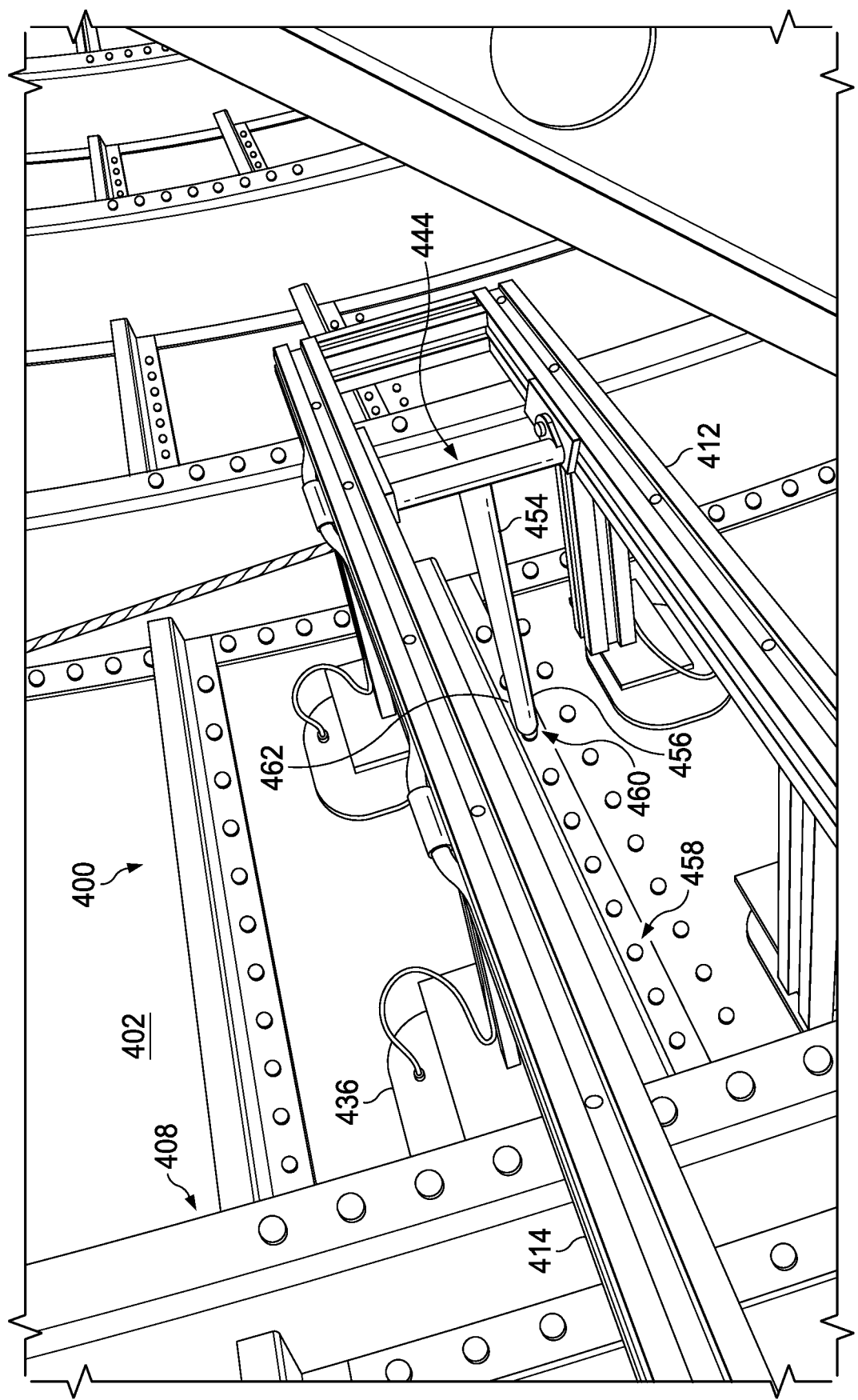
FIG. 8 illustrates a fourth step for indexing a rail system for a sliding adjustable toggle clamp, in accordance with an illustrative embodiment.

FIG. 8 illustrates a fourth step for indexing a rail system for a sliding adjustable toggle clamp, in accordance with an illustrative embodiment. FIG. 8 shows an indexing step taken after aligning the hole in indexing foot 456 with first mark 460, as described with respect to FIG. 7. In FIG. 8, indexing device 444 has been slid along rail 412 and rail 414 until a mark, rivet, or subsequent point along a row of future holes has been reached.

At that point, leg 454 of indexing device 444 is pivoted downwardly towards skin 402. The hole in indexing foot 456 is then aligned with second mark 462. This alignment is effected by adjusting the position of rail system 400 upwardly and downwardly and/or forwardly and backwardly laterally relative to skin 402 until the hole in indexing foot 456 is aligned with second mark 462. During this second adjustment, the position of rail system 400 with respect to first mark 460 remains constant.

Thus, when adjustment of rail system 400 is complete, rail system 400 is aligned with row 458. When rail system 400 is aligned with row 458, vacuum source 440 is actuated. As a result, the flanges on the ends of the legs of rail system 400, such as flange 436, are held fast to skin 402. In this manner, rail system 400 is secured tightly by one or more vacuum seals to skin 402.

Figure 9:
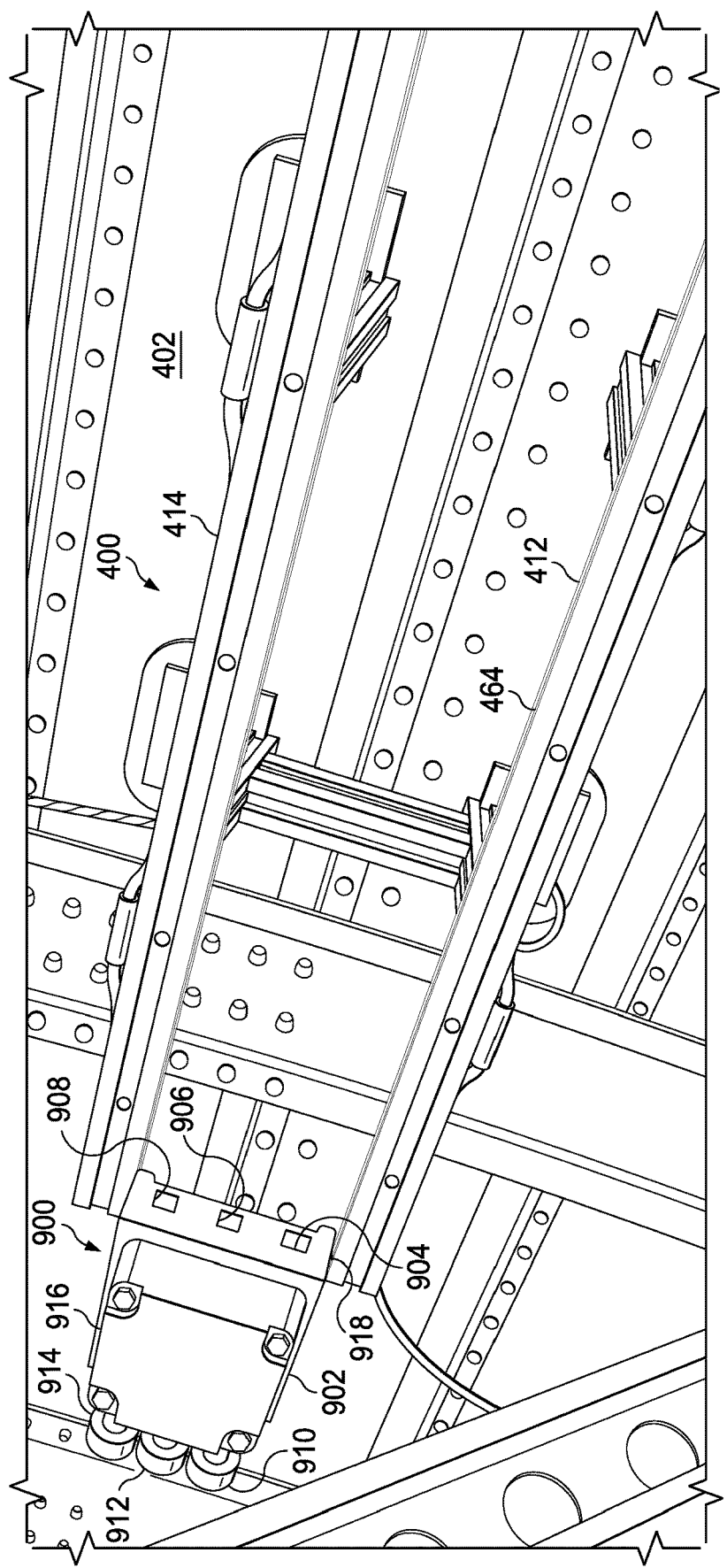
FIG. 9 illustrates a first step for using a sliding adjustable toggle clamp for applying pressure to a surface, in accordance with an illustrative embodiment.

FIG. 9 illustrates a first step for using a sliding adjustable toggle clamp for applying pressure to a surface, in accordance with an illustrative embodiment. FIG. 4 through FIG. 8 described rail system 400, its installation on skin 402, and optionally its indexing along row 458 where holes are to be drilled in skin 402. Now, FIG. 9 through FIG. 17 illustrate sliding adjustable toggle clamp 900 and its use, in conjunction with rail system 400, in applying pressure to precise predetermined locations in skin 402. More particularly, FIG. 9 shows installation of sliding adjustable toggle clamp 900 onto rail system 400.

Sliding adjustable toggle clamp 900 includes housing 902. Three holes are placed in housing, including hole 904, hole 906, and hole 908. The purpose of these holes is to receive a rod and pressure foot and to allow one of adjustment tool 910, adjustment tool 912, or adjustment tool 914 to apply force to the rod, as indicated further below. In some advantageous embodiments, force sensor 916 is attached to housing 902. As described further below, force sensor 916 may be used to monitor an amount of force applied by sliding adjustable toggle clamp 900 to the surface of skin 402.

In an illustrative embodiment, housing 902 includes indexing protrusions, such as indexing protrusion 918. Indexing protrusion 918 in this illustrative embodiment is a rail, but in other advantageous embodiments may simply be a rod that extends out of either side of housing 902. In any case, indexing protrusion 918 slides into groove 464 of rail 412. A second indexing protrusion is on the other side of housing 902 already in rail 414. Once these indexing protrusions are in place within the grooves within the rails, housing 902 may be slid along the rails.

Figure 10:
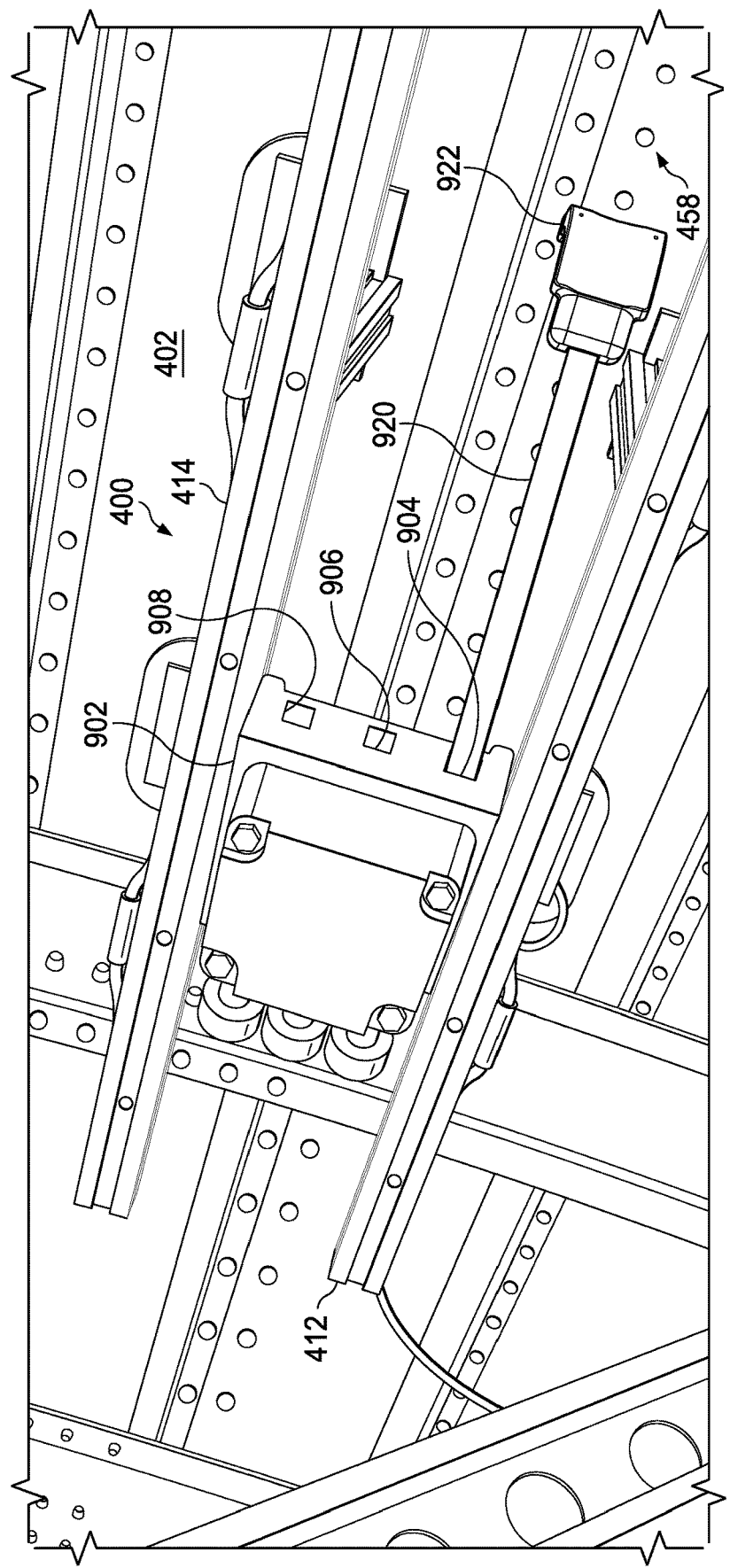
FIG. 10 illustrates a second step for using a sliding adjustable toggle clamp for applying pressure to a surface, in accordance with an illustrative embodiment.

FIG. 10 illustrates a second step for using a sliding adjustable toggle clamp for applying pressure to a surface, in accordance with an illustrative embodiment. Relative to FIG. 9, housing 902 has been slid further along rail 412 and rail 414.

FIG. 10 also shows rod 920 being inserted into hole 904. Rod 920, in conjunction with pressure foot 922, will be used to apply pressure to skin 402 of fuselage 106 of FIG. 1. Note that each of holes 904, 906, and 908 are sized and dimensioned to receive rod 920. In this manner, the technician (or robot if automatically applied) may select where, within the distance between rail 412 and rail 414, rod 920 will be located. Thus, the plurality of holes grants flexibility as to precisely where pressure will be applied to skin 402.

Rod 920 and the plurality of holes shown in FIG. 10 are all square in cross section. However, the cross section of rod 920 may be any shape, including circular, star-shaped, triangular, irregular, or any desired shape. Thus, the illustrative embodiment shown in FIG. 10 does not necessarily limit the claimed inventions below.

Figure 11:
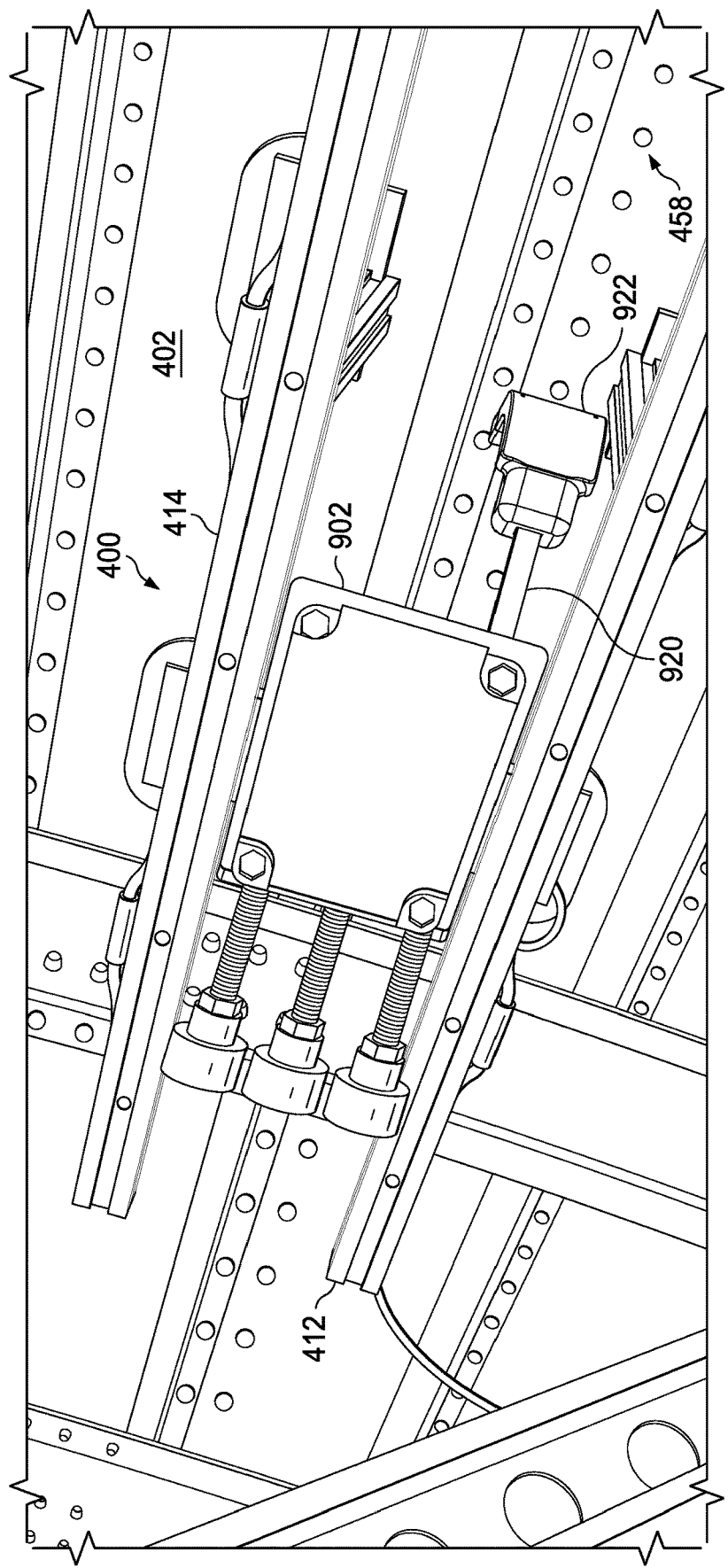
FIG. 11 illustrates a third step for using a sliding adjustable toggle clamp for applying pressure to a surface, in accordance with an illustrative embodiment.

FIG. 11 illustrates a third step for using a sliding adjustable toggle clamp for applying pressure to a surface, in accordance with an illustrative embodiment. Relative to FIG. 10, housing 902 is in the same location along rail 412 and rail 414. However, housing 902 has been pivoted downwardly towards skin 402 such that hole 904, hole 906, and hole 908 are no longer visible in this perspective.

In FIG. 11, housing 902 is being tilted so that pressure foot 922 is being brought into contact with skin 402 in the location of row 458. Again, row 458 may be a row of rivets, or a row of marks indicating where holes are to be drilled in skin 402. If marks are not used, pressure foot 922 is placed in an initial location where a future row of holes is to be drilled in skin 402. Note, also, that the distance that rod 920 is inserted into hole 904 has been adjusted such that pressure foot 922 may be placed against skin 402.

Figure 12:
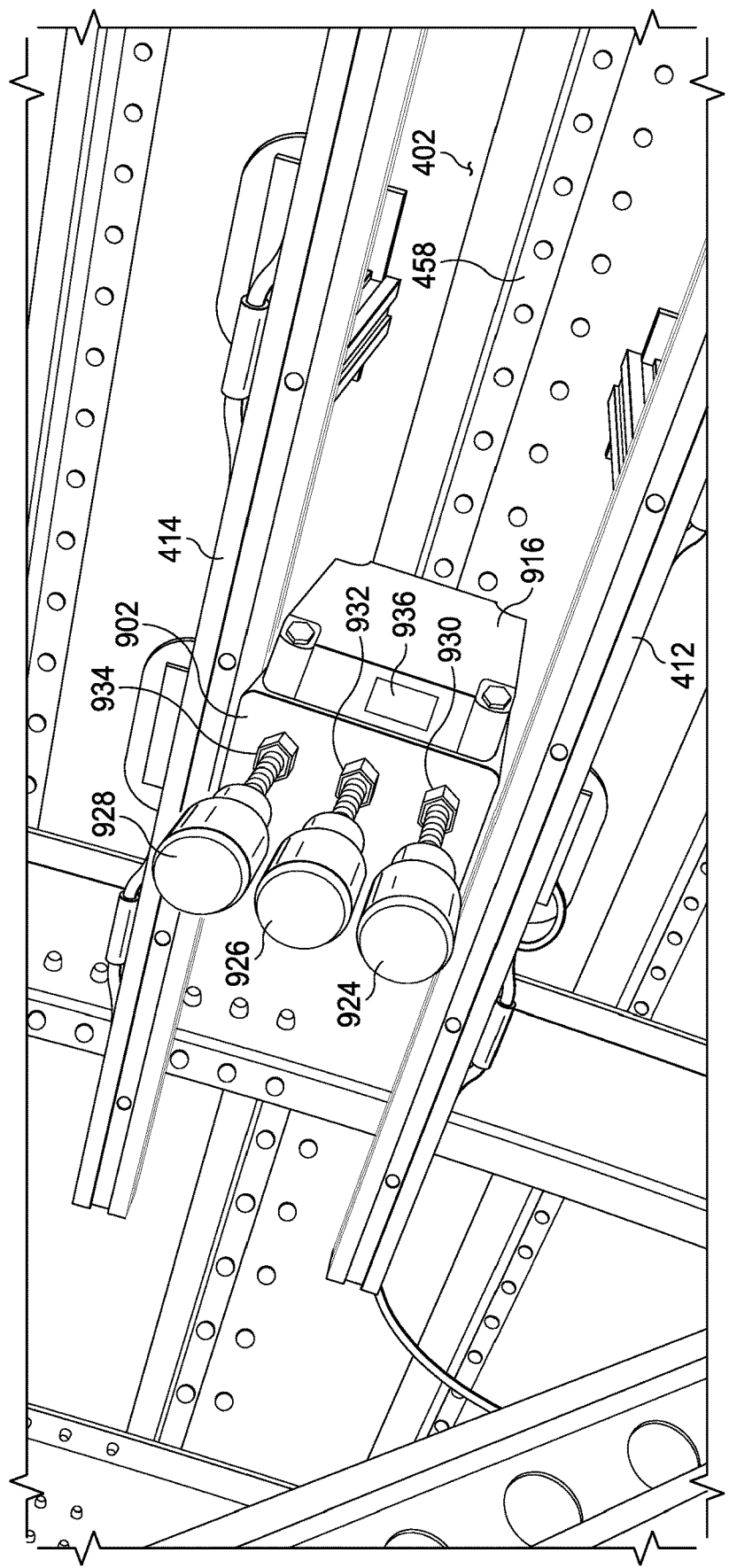
FIG. 12 illustrates a fourth step for using a sliding adjustable toggle clamp for applying pressure to a surface, in accordance with an illustrative embodiment.

FIG. 12 illustrates a fourth step for using a sliding adjustable toggle clamp for applying pressure to a surface, in accordance with an illustrative embodiment. Relative to FIG. 11, housing 902 has been tilted so that rod 920 is pointing in a direction that is about perpendicular to skin 402. Thus, in this perspective, rod 920 and pressure foot 922 are not visible. The perspective is changed again in FIG. 14 and FIG. 15 so that operation of rod 920 and pressure foot 922 become apparent.

However, in FIG. 12, adjustment to the amount of force applied to rod 920 is shown. To adjust the amount of force applied to rod 920 and thence to pressure foot 922, a plurality of knobs is provided. The knobs include knob 924, knob 926, and knob 928. Respective bolts extend from these knobs into corresponding holes, including hole 930, hole 932, and hole 934. Although the terms "knob" and "bolt" are used, these terms do not limit the shape of these objects. What is disclosed is their function, as described herein, and their shapes may vary as desired.

In an illustrative embodiment, hole 930 communicates with hole 904, hole 932 communicates with hole 906, and hole 934 communicates with hole 908 such that each hole is a single continuous hole. However, in other advantageous embodiments, intervening plates, springs, stops or other objects could be present. Thus, the holes need not fully communicate with each other.

In an illustrative embodiment, each hole 930, hole 932, and hole 934 are threaded holes. In this case, each of knob 924, knob 926, and knob 928 include threaded bolts that extend therefrom into their respective holes. Thus, a technician (or a robot if automatically applied) may turn one of the knobs to adjust the extent to which a threaded bolt extends into a respective hole. In an illustrative embodiment, the end of the threaded bolt will press against the end of the pressure foot in the opposing hole, thereby adjusting the amount of force the pressure foot applies to skin 402.

In an illustrative embodiment, force sensor 916 is attached to housing 902. Force sensor 916 includes probes (not shown) which are disposed such that force sensor 916 can sense the amount of force being applied to rod 920, and hence to skin 402. Screen 936 on force sensor 916 may display the amount of force being applied so that the technician (or robot) may evaluate whether to tighten knob 924 or loosen knob 924 until the desired amount of force is applied.

Figure 13:
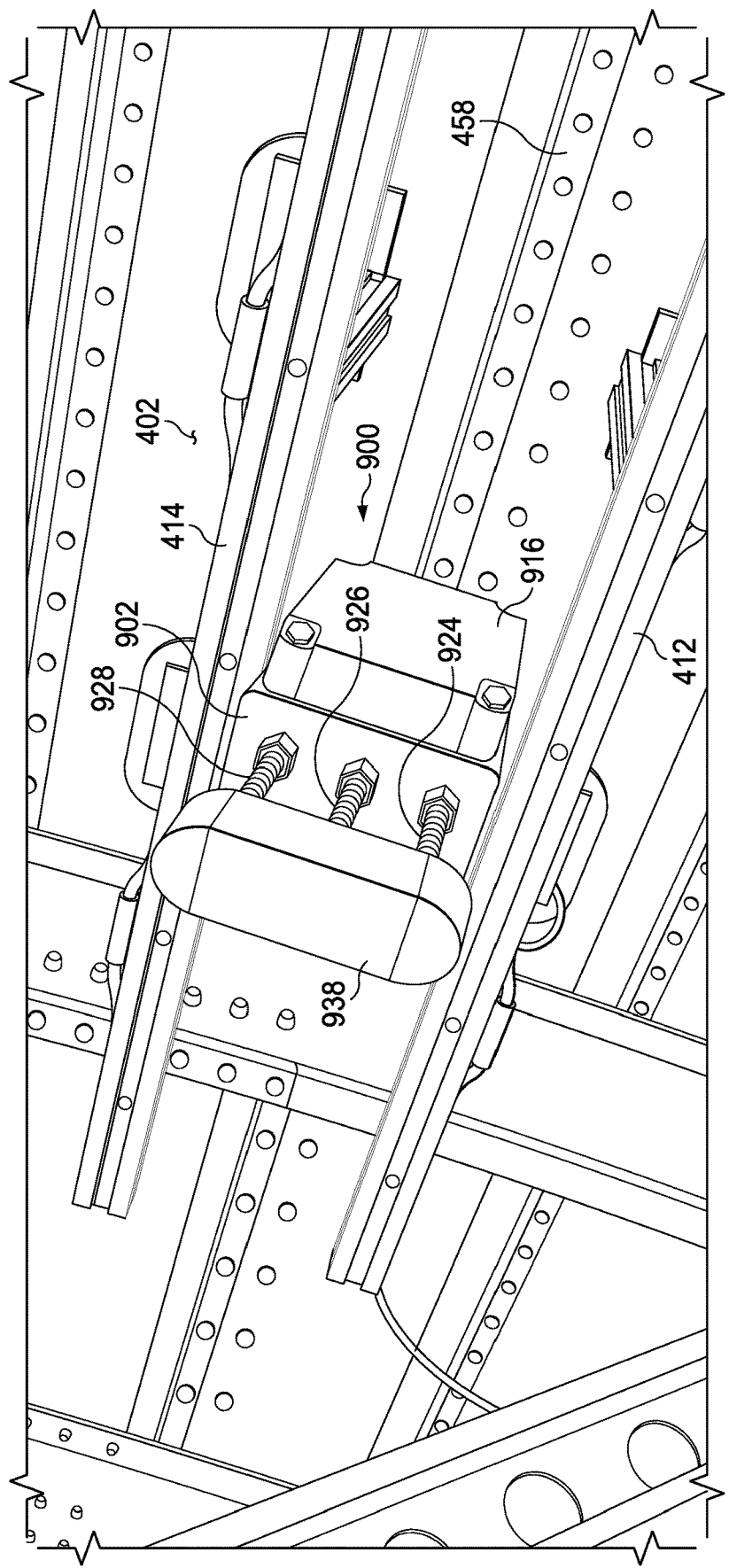
FIG. 13 illustrates a fifth step for using a sliding adjustable toggle clamp for applying pressure to a surface, in accordance with an illustrative embodiment.

FIG. 13 illustrates a fifth step for using a sliding adjustable toggle clamp for applying pressure to a surface, in accordance with an illustrative embodiment. Relative to FIG. 12, cap 938 has been added to cover knob 924, knob 926, and knob 928. Cap 938 may serve at least two functions. First, cap 938 may allow a technician to handle sliding adjustable toggle clamp 900 more easily. Second, cap 938 may protect the plurality of knobs from being actually actuated.

Figure 14:
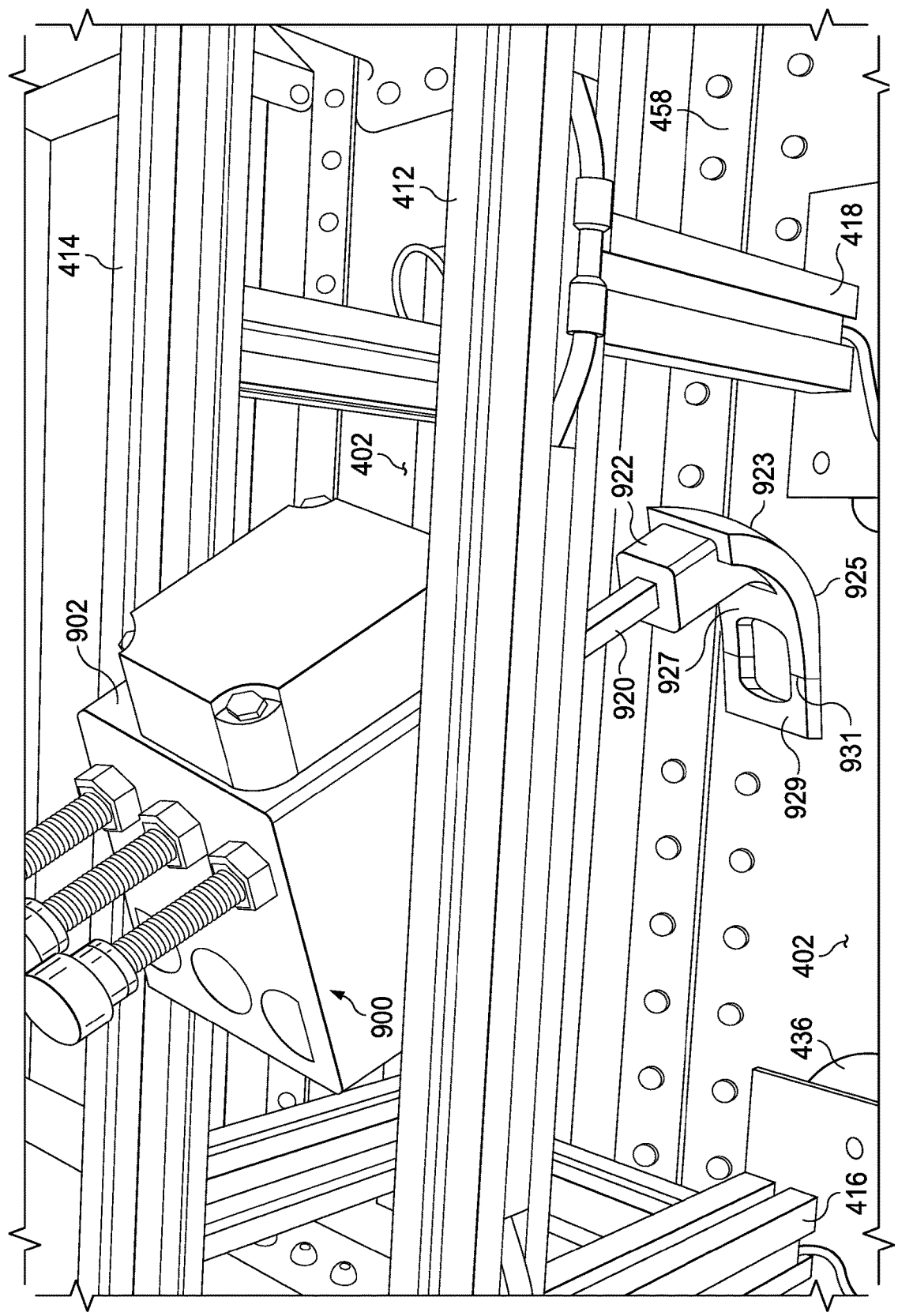
FIG. 14 illustrates a sixth step for using a sliding adjustable toggle clamp for applying pressure to a surface, in accordance with an illustrative embodiment.
Figure 15:
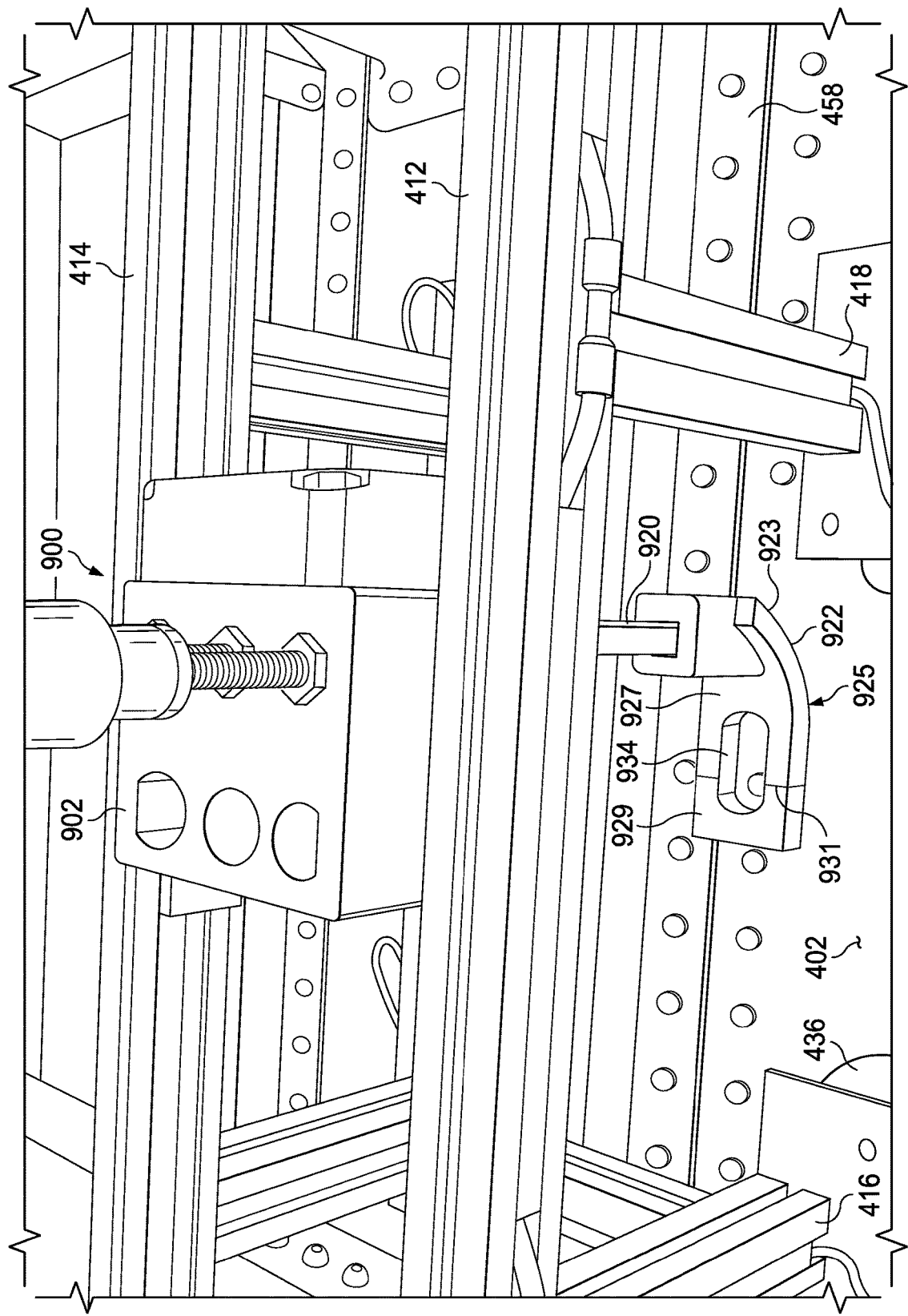
FIG. 15 illustrates a seventh step for using a sliding adjustable toggle clamp for applying pressure to a surface, in accordance with an illustrative embodiment.

In an illustrative embodiment, sliding adjustable toggle clamp 900 may be moved from mark to mark or from place to place along row 458. The procedure for doing so is to tilt sliding adjustable toggle clamp 900 upwardly, slide sliding adjustable toggle clamp 900 along rail 412 and rail 414 to the next position, and then tilt sliding adjustable toggle clamp 900 back down such that pressure foot 922 again applies pressure to skin 402. This operation is shown in FIG. 14 and FIG. 15. Because typically the distance between skin 402 and rail 412 and rail 414 remains constant along the length of row 458, the distance that rod 920 is inserted into sliding adjustable toggle clamp 900 does not need to change, and likewise the pressure applied by the corresponding knob does not need to change. Thus, the technician can simply rock and slide sliding adjustable toggle clamp 900 along the pair of rails while gripping cap 938 as desired until all holes in row 458 have been drilled.

FIG. 14 illustrates a sixth step for using a sliding adjustable toggle clamp for applying pressure to a surface, in accordance with an illustrative embodiment. FIG. 14 shows housing 902 being pivoted; representing another perspective of that shown in FIG. 10 or FIG. 11. The operation shown in FIG. 14 takes place before (or after) the operation shown in FIG. 12 and FIG. 13. FIG. 14 also shows more details of pressure foot 922.

As shown in FIG. 14, a technician is pivoting housing 902 of sliding adjustable toggle clamp 900 into place to apply pressure to skin 402 along row 458. Also shown are rail 412, rail 414, leg 416, leg 418, and flange 436 of rail system 400.

Pressure foot 922 is attached to an end of rod 920. Pressure foot 922 includes curved ankle 923 integrally formed with flat flange 925. Curved ankle 923 curves into flat flange 925. Pressure foot 922 is configured to apply pressure along a portion of the inside surface of skin 402, which may be characterized as a skin panel, when housing 902 is in a vertical position relative to the inside surface of the skin panel.

In an illustrative embodiment, flat flange 925 of pressure foot 922 may include first portion 927 integrally formed with curved ankle 923 of pressure foot 922. Flat flange 925 of pressure foot 922 may also include second portion 929 connected to first portion 927 only by elastic member 931 such that second portion 929 bends towards the pressure applying device (sliding adjustable toggle clamp 900) when the pressure applying device is pivoted against the inside surface of the skin panel. Elastic member 931 may be a pair of springs.

Thus, as shown in FIG. 14, when pressure foot 922 is initially being forced into place on skin 402, second portion 929 of flat flange 925 of pressure foot 922 bends upwardly. This action temporarily reduces the pressure applied to skin 402 as pressure foot 922 moves through an angle as sliding adjustable toggle clamp 900 is pivoted into place. However, once pivoted into place, as shown in FIG. 15, second portion 929 lies flat in the same plane as first portion 927.

FIG. 15 illustrates a seventh step for using a sliding adjustable toggle clamp for applying pressure to a surface, in accordance with an illustrative embodiment. Relative to FIG. 14, sliding adjustable toggle clamp 900 has finished pivoting into place such that rod 920 is about perpendicular to skin 402. Pressure foot 922 is now in place and the force applied by pressure foot 922 to skin 402 helps to prevent burs when a drill from the other side of skin 402 drills a hole in skin 402. The drill will drill its hole through skin 402 and through hole 934 of pressure foot 922. Thus, hole 934 of pressure foot 922 receives the drill bit driven through the other side of skin 402.

Figure 16:
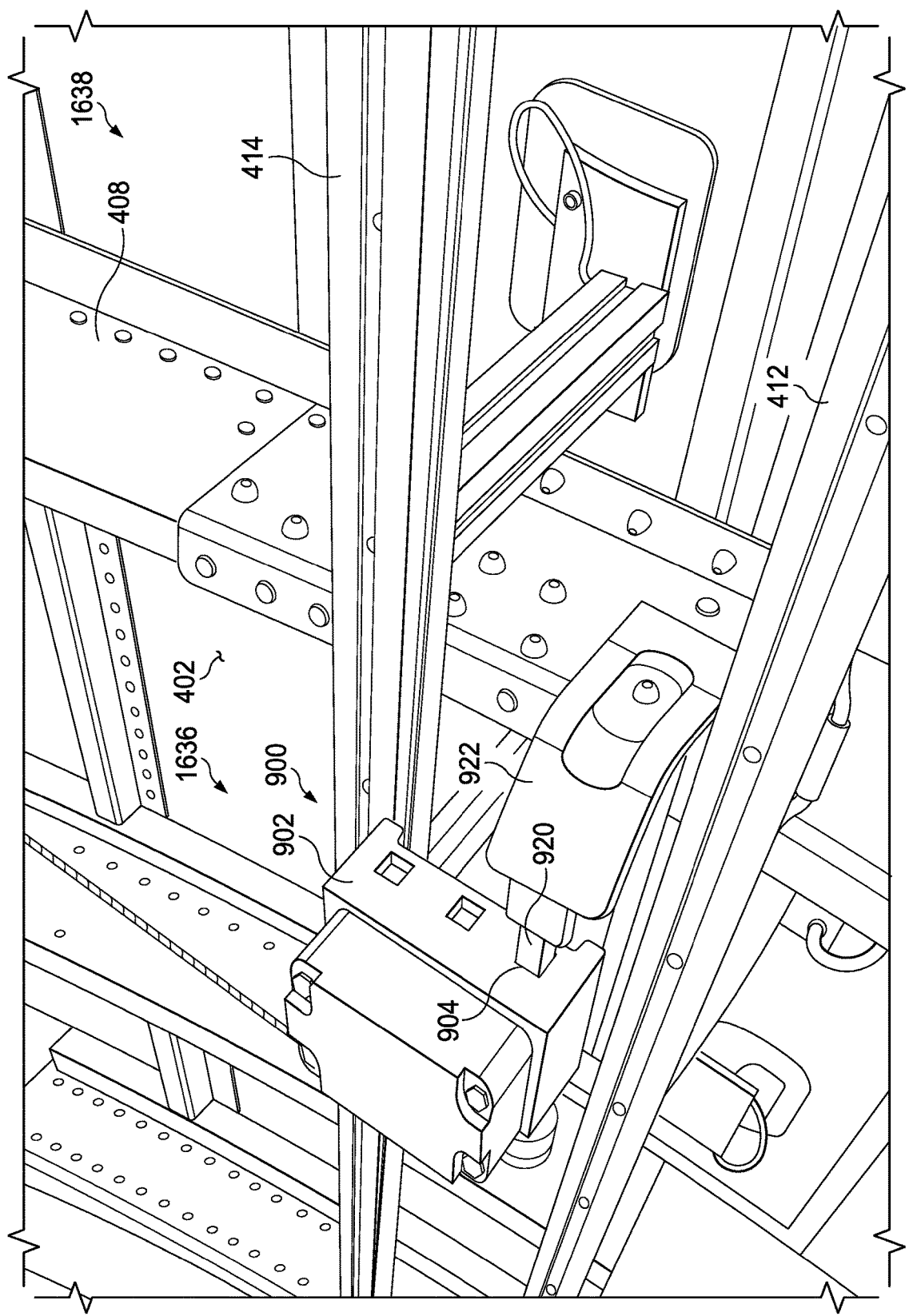
FIG. 16 illustrates an eighth step for using a sliding adjustable toggle clamp for applying pressure to a surface, in accordance with an illustrative embodiment.

FIG. 16 illustrates an eighth step for using a sliding adjustable toggle clamp for applying pressure to a surface, in accordance with an illustrative embodiment. In this illustrative embodiment, row 458 of holes has already been drilled in section 1636 of skin 402. However, now sliding adjustable toggle clamp 900 must be moved past frame 408 in order to continue applying pressure along row 458 in section 1638 of skin 402.

To accomplish this act, the technician (or robot) pivots housing 902 of sliding adjustable toggle clamp 900 a sufficient amount to lift rod 920 and pressure foot 922 over frame 408. Then the technician (or robot) slides housing 902 along rail 412 and rail 414 until sliding adjustable toggle clamp 900 is past frame 408. The technician (or robot) then pivots housing 902 of sliding adjustable toggle clamp 900 in the opposite direction until rod 920 is again about perpendicular to skin 402 so that pressure foot 922 can again apply pressure to skin 402. This process continues to repeat until all holes have been drilled or rivets driven in row 458.

Figure 17:
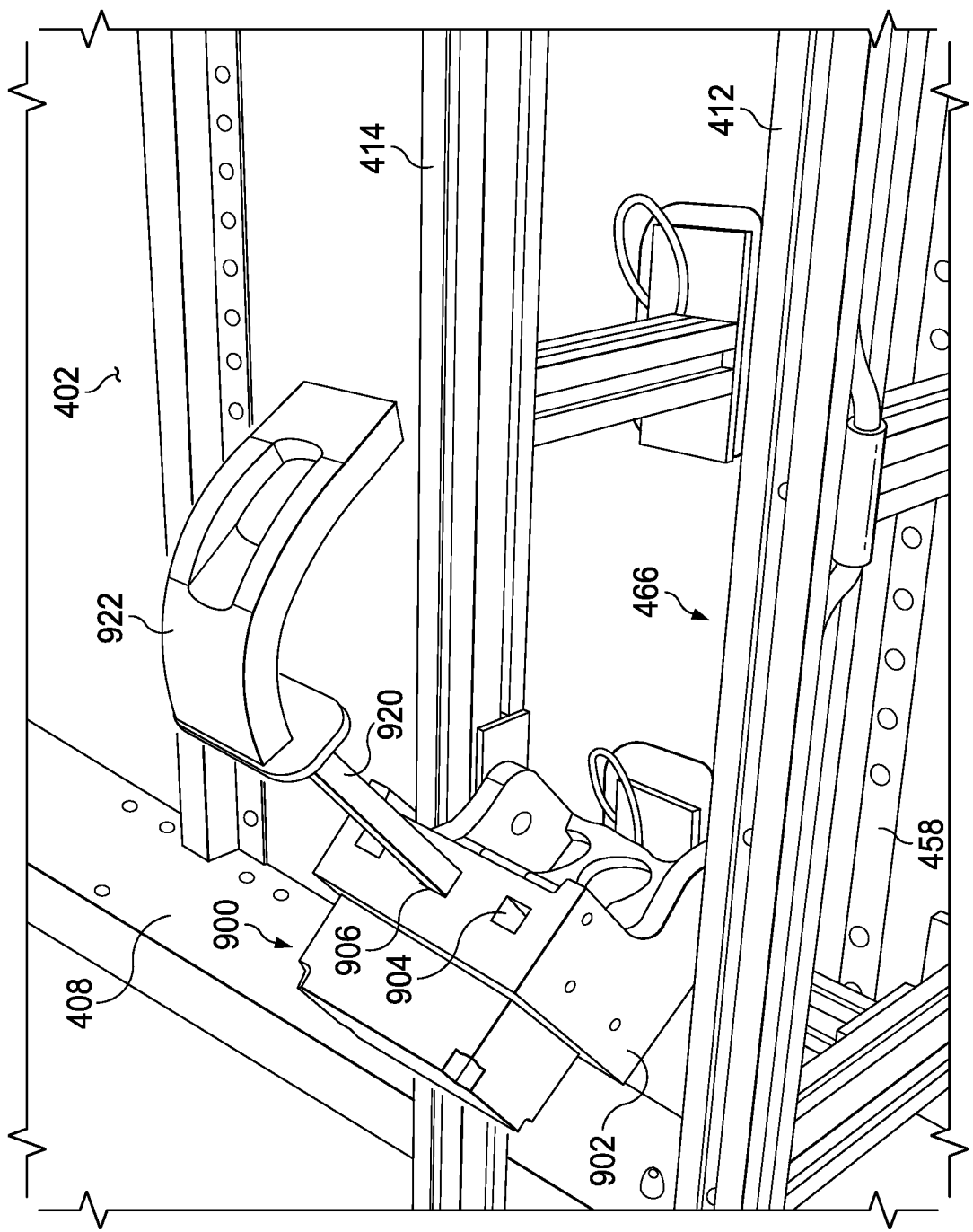
FIG. 17 illustrates a ninth step for using a sliding adjustable toggle clamp for applying pressure to a surface, in accordance with an illustrative embodiment.

FIG. 17 illustrates a ninth step for using a sliding adjustable toggle clamp for applying pressure to a surface, in accordance with an illustrative embodiment. In this operation, rod 920 is moved to another hole in housing 902 of sliding adjustable toggle clamp 900. Rod 920 may be moved to another hole in order to change to which row pressure foot 922 is applying pressure on skin 402. In FIG. 16, pressure was being applied to individual portions of row 458. In FIG. 17, pressure is to be applied to individual portions of row 466.

To accomplish this act, the technician (or robot) removes rod 920 from hole 904. The technician (or robot) then inserts rod 920 into hole 906. Housing 902 of sliding adjustable toggle clamp 900 is then tilted downwardly towards skin 402 until rod 920 is about perpendicular to skin 402. The process of tilting housing 902, sliding housing 902 along rail 412 and rail 414, and then tilting housing 902 down can be repeated for each hole to be drilled in skin 402 or each rivet to be driven. However, now row 466 can be drilled or riveted instead of row 458, but without re-aligning rail system 400 with respect to skin 402.

The advantageous embodiments described with respect to FIG. 9 through FIG. 17 may be varied. For example, more or fewer rails may be present. Additional sliding adjustable toggle clamps may be present for multiple rails, with the sliding adjustable toggle clamps possibly connected to each other for tandem sliding and pivoting. More or fewer holes may be present in housing 902. More or fewer knobs and bolts may be present in housing 902. More, fewer, or different force sensors may be present. Rail system 400 may have more or fewer legs, more or fewer flanges, more or different cross beams, all of varying configurations, placements, and shapes. The tubing for vacuum source 440 may be inside or outside of the rails shown, and may be implemented using a variety of different vacuum system models. More, fewer, or different securing systems for securing rail system 400 to skin 402 may be present. For example, clamps or braces attached to rail system 400 may be present and configured to be attached to stringers and/or frames of skin 402. Accordingly, if such clamps or braces are present, then neither legs nor flanges are necessary to attach rail system 400 to skin 402, though clamps and braces may also be provided in addition to the legs and flanges. Thus, the advantageous embodiments shown in FIG. 9 through FIG. 17 do not necessarily limit the advantageous embodiments described herein and claimed below.

Figure 18:
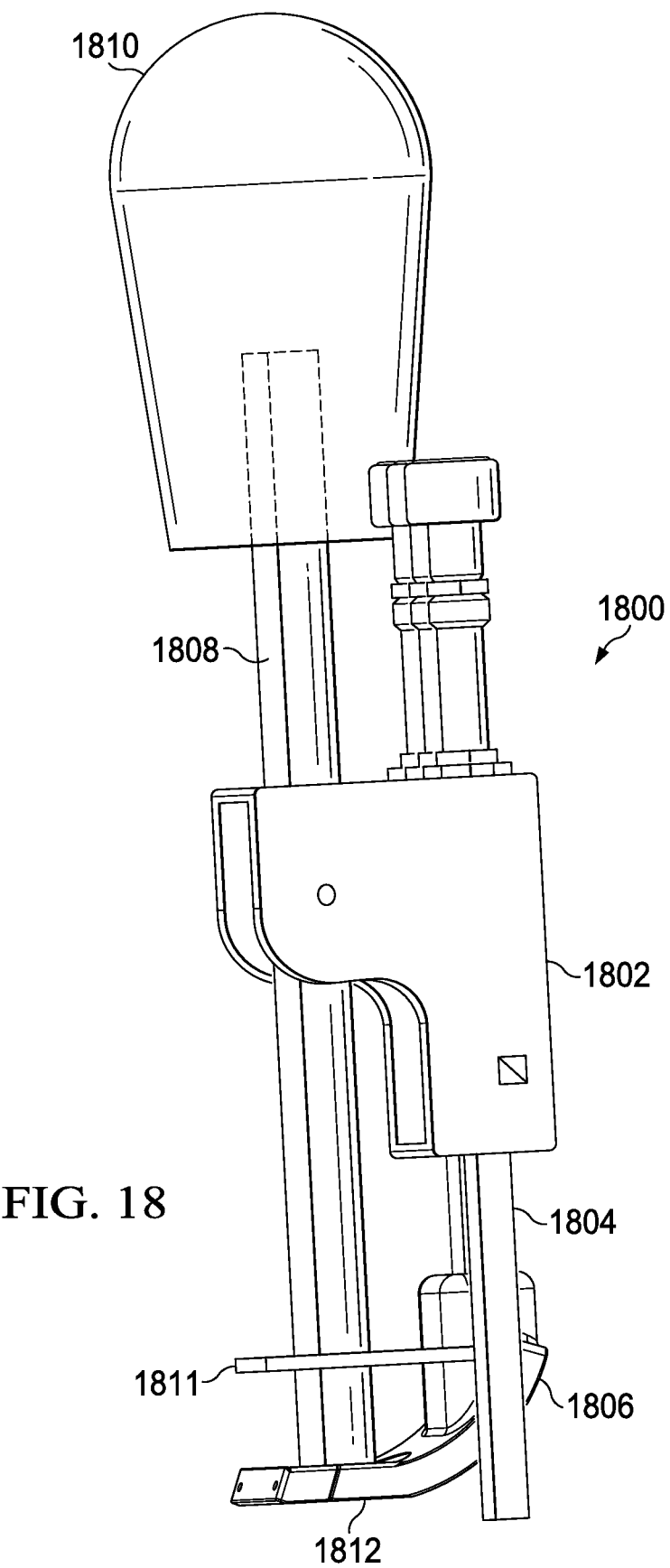
FIG. 18 illustrates a sliding adjustable toggle clamp with an additional pressure handle, in accordance with an illustrative embodiment.

FIG. 18 illustrates a sliding adjustable toggle clamp with an additional pressure handle, in accordance with an illustrative embodiment. FIG. 18 shows a possible variation in sliding adjustable toggle clamp 900 of FIG. 9 through FIG. 17. Sliding adjustable toggle clamp 1800 of FIG. 18 includes many of the same parts described with respect to sliding adjustable toggle clamp 900 of FIG. 9 through FIG. 17, such as for example, housing 1802, rod 1804 and pressure foot 1806.

However, sliding adjustable toggle clamp 1800 also includes several additional features. In particular, sliding adjustable toggle clamp 1800 also includes second rod 1808 and handle 1810. Optionally, brace 1811 can be provided to reinforce pressure foot 1806. As can be seen in FIG. 18, second rod 1808 extends from handle 1810 to flat portion 1812 of pressure foot 1806. Handle 1810 may be used by a technician (or robot) to more easily pivot and slide sliding adjustable toggle clamp 1800 during the operations described above with respect to FIG. 9 through FIG. 17. Optionally, in different advantageous embodiments, handle 1810 could be used to apply additional manual pressure to the aircraft skin panel by pushing down on handle 1810, which force is transferred to flat portion 1812 of pressure foot 1806. Note that other variations of sliding adjustable toggle clamp 1800 are possible, such as but not limited to additional rods, or different configurations of housing 1802.

Figure 19:
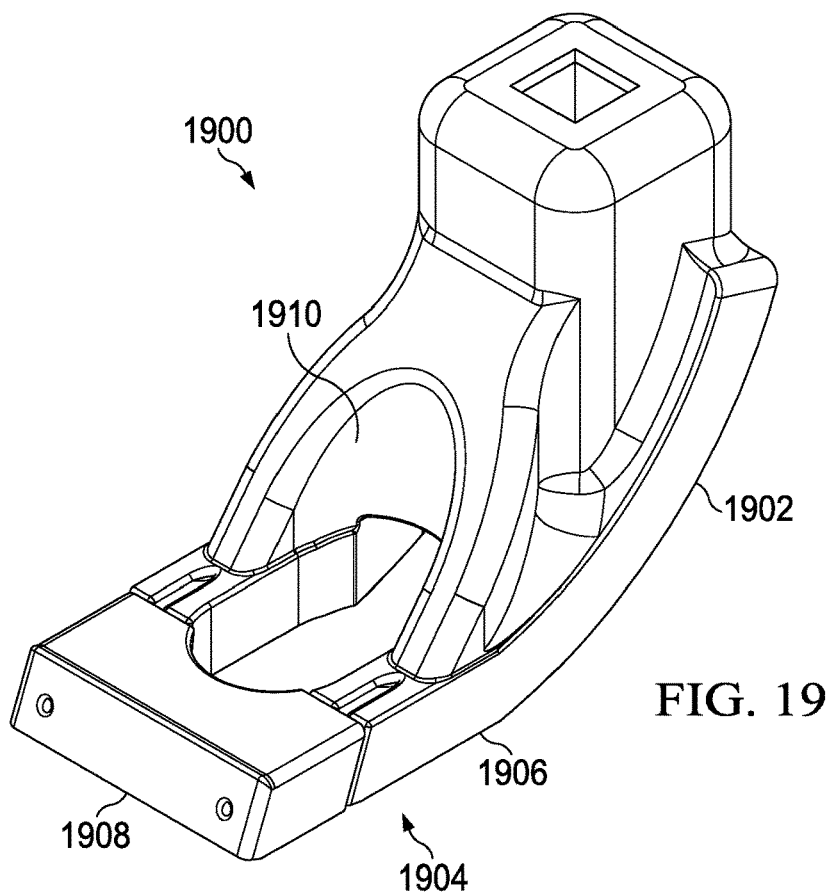
FIG. 19 illustrates a first variation of a pressure foot, in accordance with an illustrative embodiment.
Figure 20:
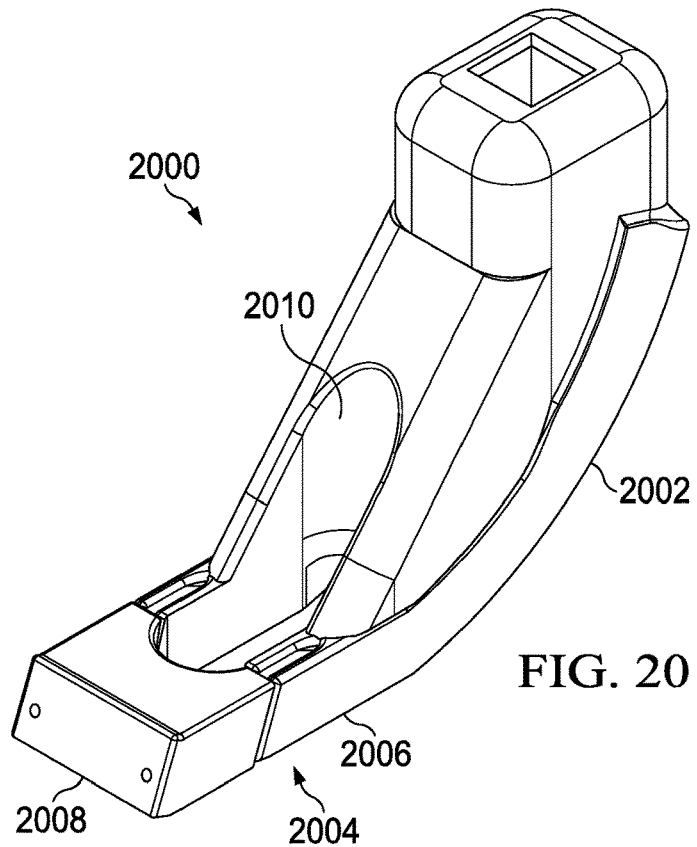
FIG. 20 illustrates a second variation of a pressure foot, in accordance with an illustrative embodiment.
Figure 21:
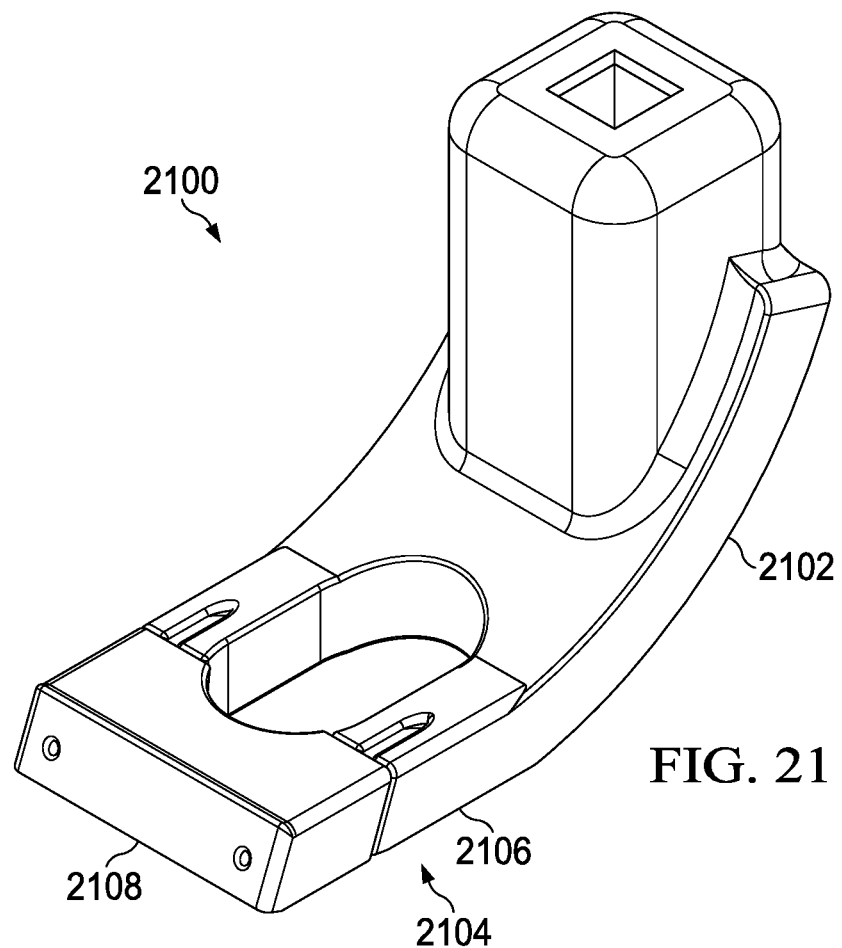
FIG. 21 illustrates a third variation of a pressure foot, in accordance with an illustrative embodiment.

FIG. 19 through FIG. 21 illustrate variations of pressure foot 922 of FIG. 9 through FIG. 17, or of pressure foot 1806 of FIG. 18. Thus, FIG. 19 through FIG. 21 should be viewed together.

In particular, FIG. 19 illustrates a first variation of a pressure foot, in accordance with an illustrative embodiment. Pressure foot 1900 includes ankle portion 1902 and flat portion 1904. Flat portion 1904 includes integral segment 1906 and separate segment 1908. Separate segment 1908 is connected to integral segment 1906 via springs or other elastic members that allow separate segment 1908 to move during placement on a skin panel, as described with respect to FIG. 14. In this illustrative embodiment, pressure foot 1900 also includes a U-shaped arch 1910 which reinforces or braces ankle portion 1902 and integral segment 1906 of flat portion 1904.

FIG. 20 illustrates a second variation of a pressure foot, in accordance with an illustrative embodiment. Pressure foot 2000 includes ankle portion 2002 and flat portion 2004. Flat portion 2004 includes integral segment 2006 and separate segment 2008. Separate segment 2008 is connected to integral segment 2006 via springs or other elastic members that allow separate segment 2008 to move during placement on a skin panel, as described with respect to FIG. 14. In this illustrative embodiment, pressure foot 2000 also includes a U-shaped arch 2010 which reinforces or braces ankle portion 2002 and integral segment 2006 of flat portion 2004. U-shaped arch 2010, and the overall dimensions of pressure foot 2000, are more narrow than corresponding dimensions of pressure foot 1900 of FIG. 19.

Different pressure feet of different dimensions could be used in the same housing, depending on the holes being drilled or the size of the rows being treated while applying pressure during drilling or riveting operations. Thus, for example, pressure foot 1900 of FIG. 19 could extend from one portion of a housing of a sliding adjustable toggle clamp, and pressure foot 2000 of FIG. 20 could extend from an adjacent portion of the housing of the sliding adjustable toggle clamp.

FIG. 21 illustrates a third variation of a pressure foot, in accordance with an illustrative embodiment. Pressure foot 2100 includes ankle portion 2102 and flat portion 2104. Flat portion 2104 includes integral segment 2106 and separate segment 2108. Separate segment 2108 is connected to integral segment 2106 via springs or other elastic members that allow separate segment 2108 to move during placement on a skin panel, as described with respect to FIG. 14. In this illustrative embodiment, pressure foot 2100 does not include a U-shaped arch, such as described with respect to FIG. 19 or FIG. 20. Thus, in some advantageous embodiments, reinforcement to pressure foot 2100 may not be desirable or necessary.

Figure 22:
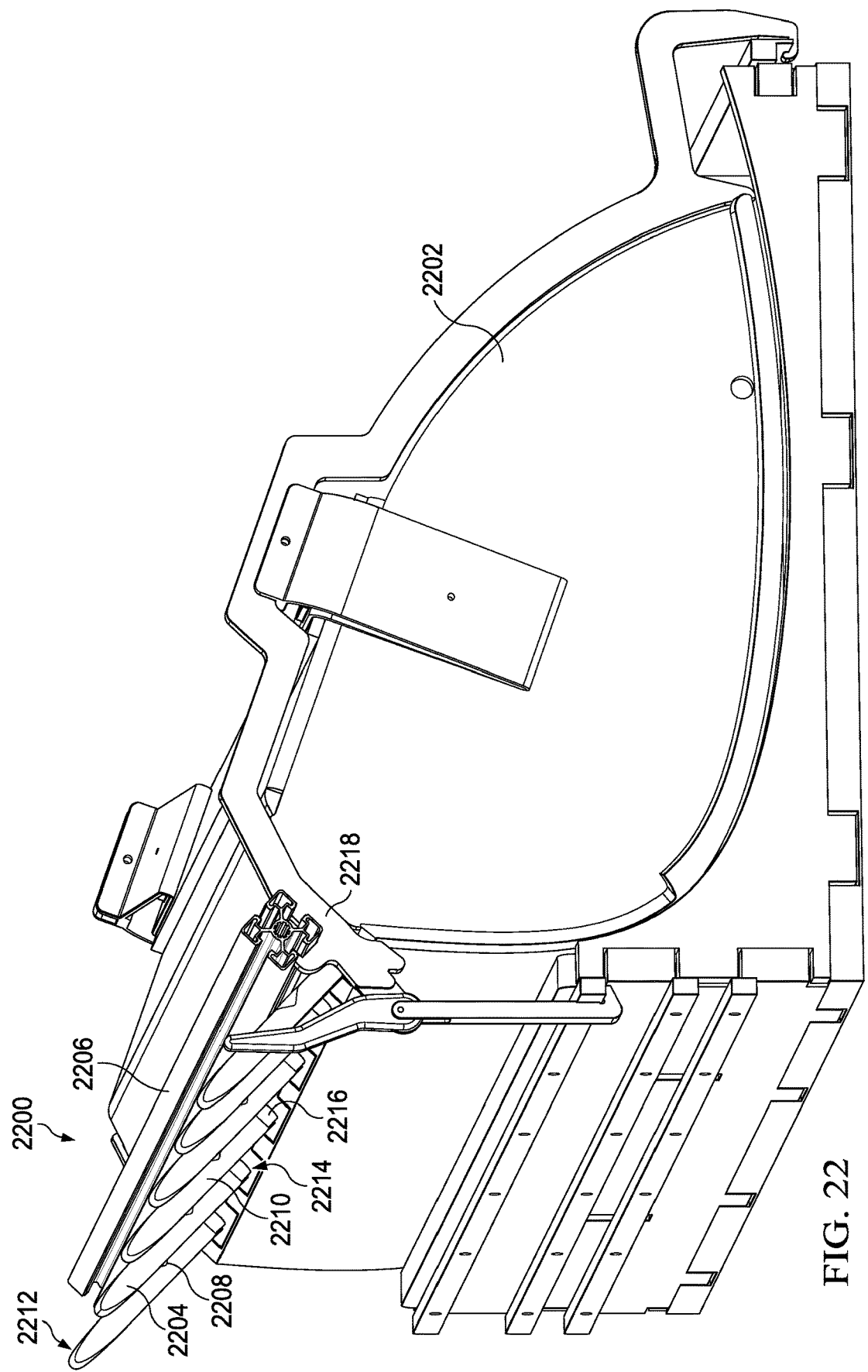
FIG. 22 illustrates a manually operated clamp and rail system, in accordance with an illustrative embodiment.
Figure 23:
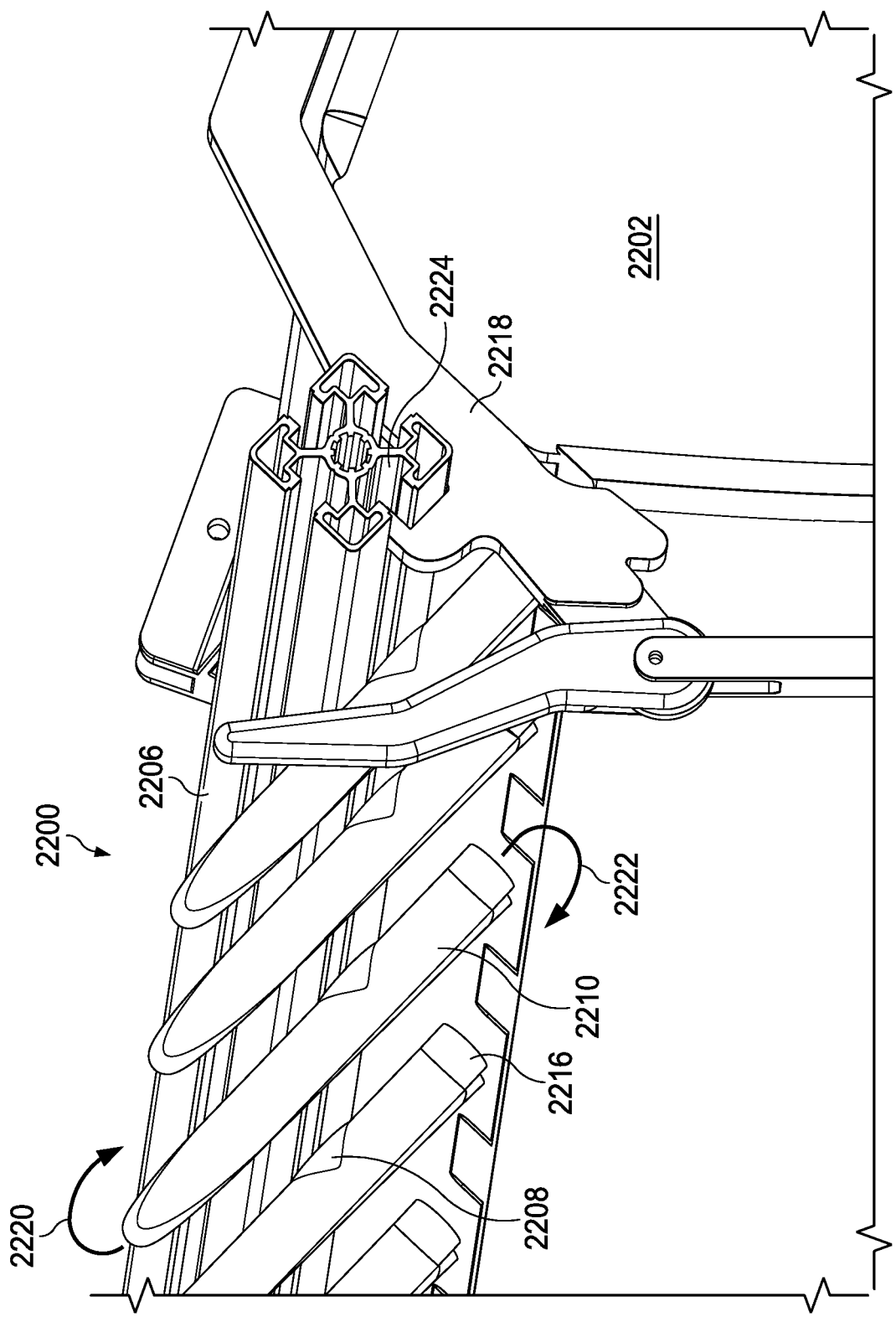
FIG. 23 illustrates a close-up view of the manually operated clamp and rail system shown in FIG. 22, in accordance with an illustrative embodiment.

FIG. 22 through FIG. 23 show another illustrative embodiment of a clamp and rail system. The illustrative embodiments shown in FIG. 22 through FIG. 23 should be viewed together and have similar reference numerals.

FIG. 22 illustrates a manually operated clamp and rail system, in accordance with an illustrative embodiment. In particular clamp and rail system 2200 is designed to operate during the manufacture of stow bin 2202, which is intended for installation in an aircraft such as aircraft 100 of FIG. 1.

Clamp and rail system 2200 includes manually operated clamp 2204 capable of being positioned along rail 2206, for use in the fabrication and assembly of aircraft stow bins, such as stow bin 2202. Manually operated clamp 2204 includes sliding pivot 2208 positionable along rail 2206. Lever 2210 attached to sliding pivot 2208 comprises first end 2212 including a hand grip and second end 2214 including clamp foot 2216. Clamp foot 2216 remains in a stationary position and applies a force to a workpiece (stow bin 2202), when lever 2210 is positioned so that the direction of said force is generally normal to said rail 2206.

In an illustrative embodiment, multiple levers are provided. Each lever may be slid along rail 2206 in order to position each lever individually with respect to stow bin 2202. Note that clamp and rail system 2200 also includes frame 2218 which is fixed to stow bin 2202.

FIG. 23 illustrates a close-up view of the manually operated clamp and rail system shown in FIG. 22, in accordance with an illustrative embodiment. FIG. 23 shows the same clamp and rail system shown in FIG. 22. Thus, FIG. 22 and FIG. 23 share common reference numerals.

In particular, FIG. 23 shows how lever 2210 can be pivoted about sliding pivot 2208, as indicated by arrow 2220 and arrow 2222. Pivoting lever 2210 will either loosen the clamping force against stow bin 2202, or will apply the clamping force against stow bin 2202, depending on where clamp foot 2216 is located relative to stow bin 2202. When clamp foot 2216 of lever 2210 is about normal to rail 2206 and to stow bin 2202, then pressure against stow bin 2202 is set to a predetermined amount. The predetermined amount depends on the distance between rail 2206 and stow bin 2202, and the length of lever 2210. When clamp foot 2216 of lever 2210 is not in contact with stow bin 2202, then force is not applied to stow bin 2202 and sliding pivot 2208 can be slid along groove 2224 in rail 2206 to a different position, if desired.

Figure 24:
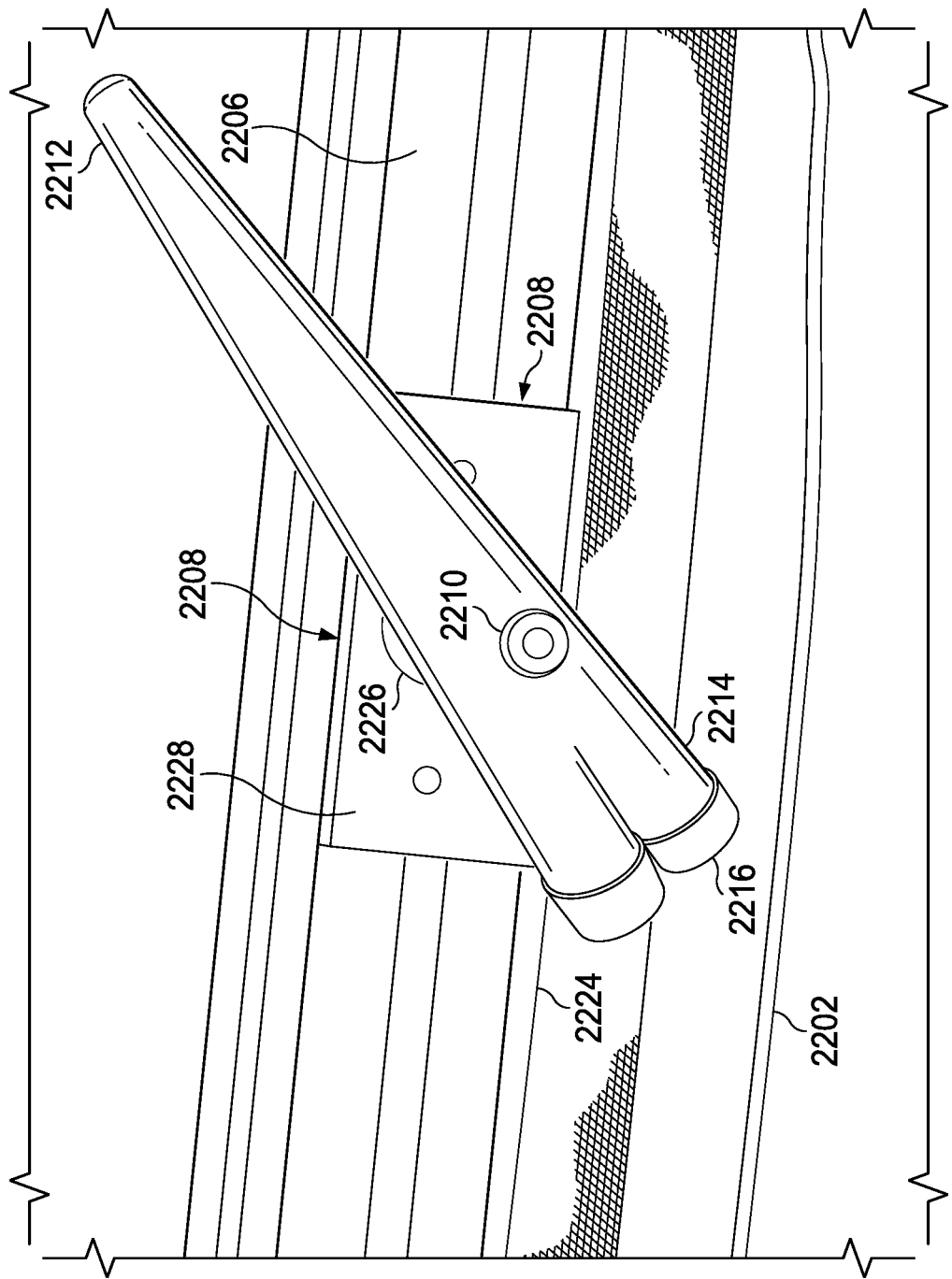
FIG. 24 illustrates use of a specific clamp of the manually operated clamp and rail system shown in FIG. 22, in accordance with an illustrative embodiment.

FIG. 24 illustrates use of a specific clamp of the manually operated clamp and rail system shown in FIG. 22, in accordance with an illustrative embodiment. Clamp and rail system 2200 in FIG. 24 is the same clamp and rail system shown in FIG. 22 and FIG. 23.

In the illustrative embodiment shown in FIG. 24, additional details regarding sliding pivot 2208 are shown. As can be seen in FIG. 24, sliding pivot 2208 includes fulcrum 2226 about which lever 2210 pivots. In turn, fulcrum 2226 is located within body 2228. Body 2228 is inserted into groove 2224 of rail 2206 such that body 2228 may be slid along rail 2206. For example, a rail-shaped protrusion (not shown) in body 2228 can be inserted into groove 2224. By sliding body 2228 along rail 2206 and by rotating lever 2210 about fulcrum 2226, the location of lever 2210 relative to stow bin 2202 and rail 2206 can be changed, and the amount of force applied by lever 2210 to stow bin 2202 can also be changed.

Figure 25:
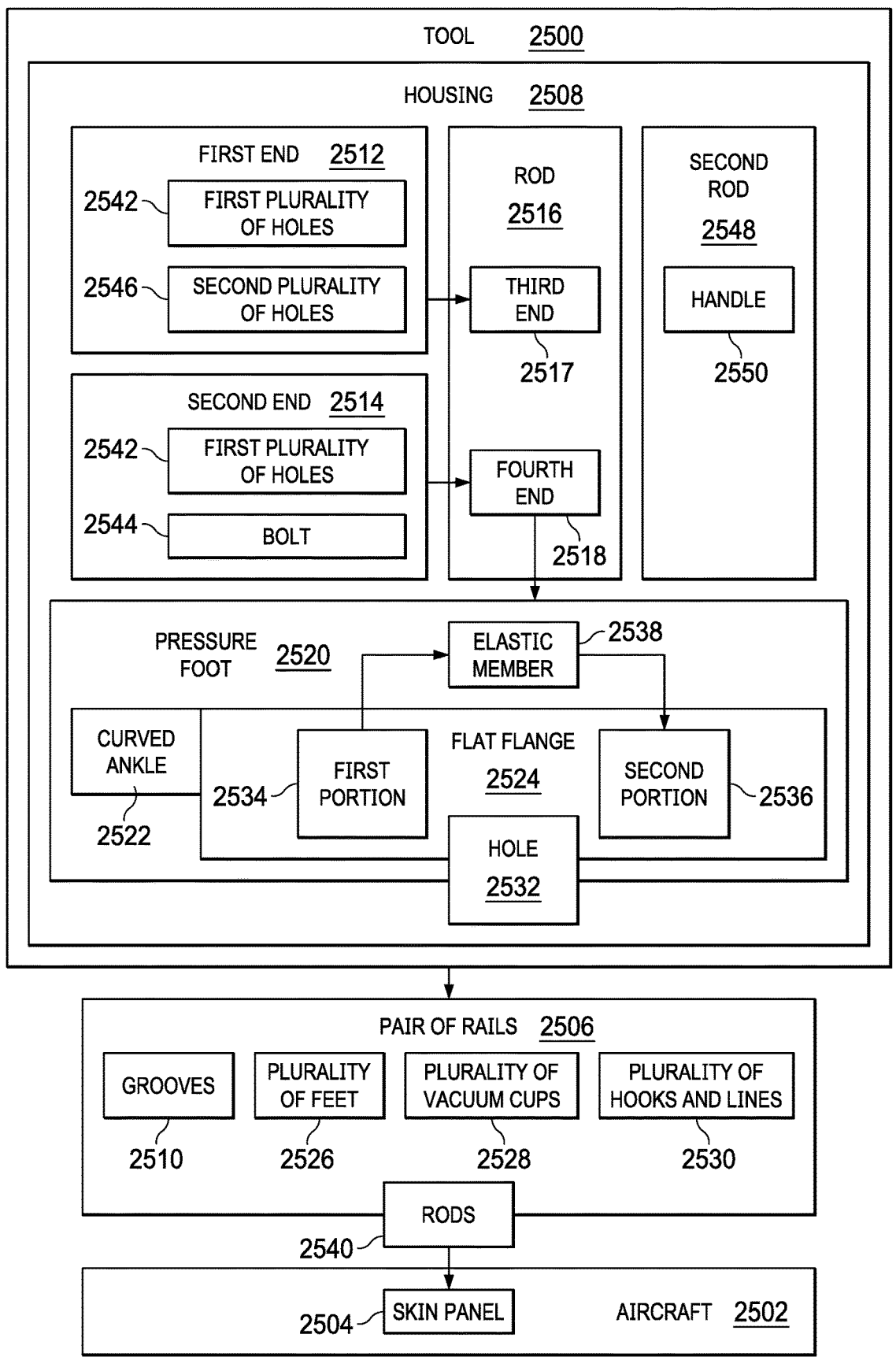
FIG. 25 is a block diagram of a sliding adjustable toggle clamp, in accordance with an illustrative embodiment.

FIG. 25 is a block diagram of a sliding adjustable toggle clamp, in accordance with an illustrative embodiment. Sliding adjustable toggle clamp 2500 of FIG. 25 is a variation of sliding adjustable toggle clamp 900 of FIG. 9 through FIG. 17, and of clamp and rail system 2200 of FIG. 22 through FIG. 24.

Sliding adjustable toggle clamp 2500 may be characterized as a tool for applying pressure to an inside surface of skin panel 2504 of aircraft 2502. Tool 2500 includes pair of rails 2506 attachable to the inside surface of skin panel 2504. Tool 2500 also includes housing 2508 pivotally and slidably connected to pair of rails 2506 between facing inside surfaces of pair of rails 2506 such that housing 2508 is pivotable about a first axis defined between the facing inside surfaces of pair of rails 2506 and through housing 2508, and such that housing 2508 is slidable along grooves 2510 of pair of rails 2506. Housing 2508 has first end 2512 and second end 2514 opposite each other relative to pair of rails 2506.

Tool 2500 also includes rod 2516 having third end 2517 and fourth end 2518. Third end 2517 is attached to and extends from first end 2512 of housing 2508.

Tool 2500 also includes pressure foot 2520 attached to fourth end 2518 of rod 2516. Pressure foot 2520 includes curved ankle 2522 integrally formed with flat flange 2524. Curved ankle 2522 curves into flat flange 2524. Pressure foot 2520 is configured to apply pressure along a portion of the inside surface of skin panel 2504 when housing 2508 is in a vertical position relative to the inside surface of skin panel 2504.

The advantageous embodiments described above may be varied. For example, pair of rails 2506 may further include plurality of feet 2526 attached to pair of rails 2506. Plurality of feet 2526 may have a corresponding plurality of vacuum cups 2528 disposed on ends of plurality of feet 2526. In this manner, plurality of rails 2506 is attachable to the inside surface of skin panel 2504.

In another illustrative embodiment, pair of rails 2506 may further include plurality of hooks and lines 2530. Plurality of hooks and lines 2530 may be configured for attachment to stringers or frame members of the inside surface of the skin panel.

In another illustrative embodiment, pair of rails 2506 may extend along a second axis that is about perpendicular to the first axis. In still another illustrative embodiment, hole 2532 is disposed inside flat flange 2524 of pressure foot 2520, the hole sized and dimensioned to receive a drill bit driven from an opposite side of the skin panel.

In a different illustrative embodiment, flat flange 2524 of pressure foot 2520 may include first portion 2534 integrally formed with curved ankle 2522 of pressure foot 2520. Pressure foot 2520 also may include second portion 2536 connected to first portion 2534 only by elastic member 2538 such that second portion 2536 bends towards housing 2508 when housing 2508 is pivoted against the inside surface of skin panel 2504. Elastic member 2538 may be a pair of springs.

In yet another illustrative embodiment, pair of rails 2506 each may have grooves 2510 along a length of pair of rails 2506. In this case, housing 2508 includes rods 2540 that extend outside housing 2508 along the first axis and into grooves 2510 such that housing 2508 is slidable along grooves 2510.

Pair of rails 2506 may be about parallel to each other. Rod 2516 may have a cross section in a shape selected from the group consisting of a square, a circle, a star, or an irregular shape.

In yet another illustrative embodiment, housing 2508 may include first plurality of holes 2542 disposed on second end 2514 of housing 2508 and arranged along the first axis. In this case, tool 2500 further includes bolt 2544 disposed in any one of first plurality of holes 2542. Bolt 2544 may be selectively extendable into any one of first plurality of holes 2542. In another illustrative embodiment, bolt 2544 may be threaded and may be selectively extendable into the any one of first plurality of holes 2542 by screwing bolt 2544 into any one of first plurality of holes 2542.

In still another illustrative embodiment, first plurality of holes 2542 extends entirely through to first end 2512 of housing 2508. In this case, rod 2516 is removably attached to any one of first plurality of holes 2542. Rod 2516 is removably attached in a same hole in which bolt 2544 is threaded. Thus, bolt 2544 and rod 2516 are in contact with each other inside the same hole. In this case, changing a distance that bolt 2544 is extended into the same hole changes an amount of force applied to pressure foot 2520 through rod 2516.

In another illustrative embodiment, housing 2508 includes second plurality of holes 2546 disposed on first end 2512 of housing 2508 and arranged along the first axis. In this case, rod 2516 is removably attached to any one of second plurality of holes 2546.

In another illustrative embodiment, second rod 2548 is attached to housing 2508 about parallel to rod 2516. In this case, second rod 2548 is attached to pressure foot 2520 and extends to at least second end 2514 of housing 2508. In a related illustrative embodiment, handle 2550 may be attached to second rod 2548. In this manner, additional pressure applied to handle 2550 applies additional pressure through second rod 2548 and to pressure foot 2520.

Figure 26:
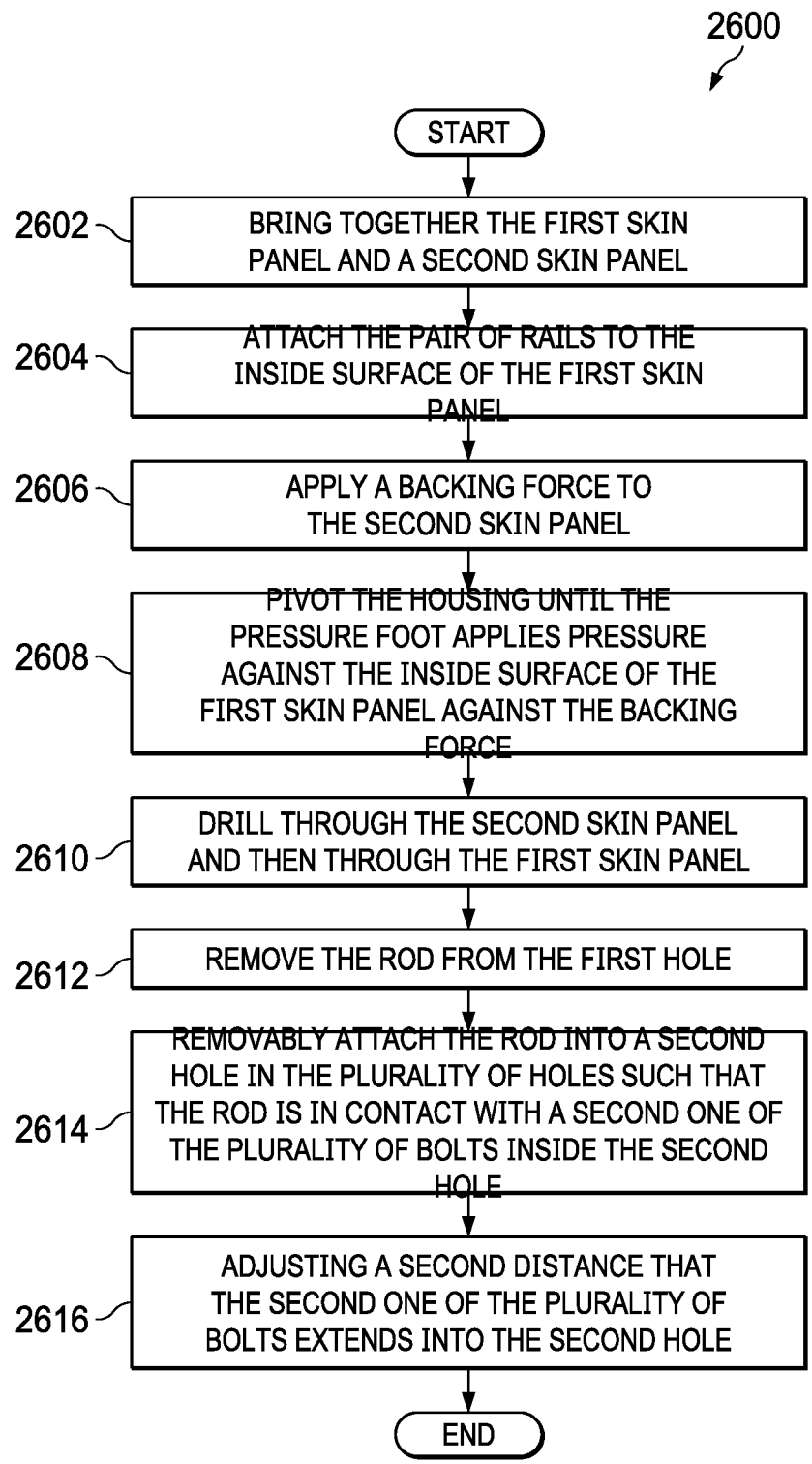
FIG. 26 is a flowchart of a method for using a sliding adjustable toggle clamp, in accordance with an illustrative embodiment.

FIG. 26 is a flowchart of a method for using a sliding adjustable toggle clamp, in accordance with an illustrative embodiment. Method 2600 is a method of using a tool, such as tool 2500 of FIG. 25. Method 2600 may also be implemented using the devices and techniques described with respect to FIG. 4 through FIG. 17.

Method 2600 may be characterized as a method for manufacturing an aircraft using a tool. The tool includes a pair of rails attachable to an inside surface of a first skin panel; a housing pivotally and slidably connected to the pair of rails between facing inside surfaces of the pair of rails such that the housing is pivotable about a first axis defined between the facing inside surfaces of the pair of rails and through the housing, and such that the housing is slidable along the grooves of the pair of rails, the housing having a first end and a second end opposite each other relative to the pair of rails; a rod having a third end and a fourth end, the third end attached to and extending from the first end of the housing; and a pressure foot attached to the fourth end of the housing, the pressure foot comprising a curved ankle integrally formed with a flat flange, the curved ankle curving into the flat flange, and wherein the pressure foot is configured to apply pressure along a portion of the inside surface of the first skin panel when the housing is in a vertical position relative to the inside surface of the first skin panel.

In conjunction with using this tool, method 2600 includes bringing together the first skin panel and a second skin panel (operation 2602). Next, method 2600 includes attaching the pair of rails to the inside surface of the first skin panel (operation 2604). Next, method 2600 includes applying a backing force to the second skin panel (operation 2606). Next, method 2600 includes pivoting the housing until the pressure foot applies pressure against the inside surface of the first skin panel against the backing force (operation 2608). In an illustrative embodiment, the method may terminate thereafter.

Method 2600 may include more or fewer operations. In an illustrative embodiment, an additional operation may include drilling through the second skin panel and then through the first skin panel (operation 2610). In this case a drill bit extends into a hole disposed in the pressure foot after drilling. Optionally, the method may terminate thereafter.

Method 2600 may be further varied. For example, the housing may also include a plurality of holes disposed on the second end of the housing and arranged along the first axis; wherein the tool further comprises a plurality of bolts disposed corresponding ones of the plurality of holes; the plurality of bolts being selectively extendable into the plurality of holes; wherein the plurality of bolts is threaded and is selectively extendable into the plurality of holes by screwing the plurality of bolts into the any one of the plurality of holes; the plurality of holes extend entirely through to the first end of the housing; wherein the rod is removably attached to any one of the plurality of holes at the first end of the housing; wherein the rod and a corresponding one of the plurality of bolts are in contact with each other inside a first of the plurality of holes; wherein changing a distance that the corresponding one of the plurality of bolts is extended into the first hole changes an amount of force applied to the pressure foot through the rod.

When the housing includes these additional features, method 2600 may further include removing the rod from the first hole (operation 2612). In this case, method 2600 may further include removably attaching the rod into a second hole in the plurality of holes such that the rod is in contact with a second one of the plurality of bolts inside the second hole (operation 2614). Method 2600 then may further include adjusting a second distance that the second one of the plurality of bolts extends into the second hole (operation 2616). In this manner, an amount of pressure applied by the pressure foot through the rod may be adjusted. The method may terminate thereafter.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing an aircraft, the method comprising:
using a tool comprising:
a pair of rails configured to attach to an inside surface of a first skin panel;
a housing pivotally and slidably connected to the pair of rails between facing inside surfaces of the pair of rails such that the housing is pivotable about a first axis defined between the facing inside surfaces of the pair of rails and through the housing, and such that the housing is slidable along grooves in the pair of rails, the housing, located between the pair of rails, comprising a first end and a second end opposite each other;
a rod having a third end and a fourth end, the third end attached to and extending from the first end of the housing; and
a pressure foot attached to the fourth end of the rod, the pressure foot comprising a curved portion integrally formed with a flat flange, the curved portion curving into the flat flange, and wherein the pressure foot is configured to apply pressure along a portion of the inside surface of the first skin panel when a longitudinal axis defined between the first end and the second end of the housing is normal relative to the inside surface of the first skin panel;
bringing together the first skin panel and a second skin panel;
attaching the pair of rails to the inside surface of the first skin panel;
applying a backing force to the second skin panel; and
pivoting the housing about the first axis until the pressure foot applies a pressure against the inside surface of the first skin panel against the backing force.

2. The method of claim 1, further comprising:
drilling through the second skin panel and then through the first skin panel, wherein a drill bit extends into a hole disposed in the pressure foot after the drilling.

3. The method of claim 1, further comprising:
the housing comprising a plurality of holes disposed on the second end of the housing and arranged along the first axis;
the tool further comprising a plurality of bolts disposed in corresponding ones of the plurality of holes;
the plurality of bolts being threaded and selectively extendable into the plurality of holes by screwing the plurality of bolts into any one of the plurality of holes;
the plurality of holes extending entirely through to the first end of the housing;
the rod being removably attached to any one of the plurality of holes at the first end of the housing;
the rod and a corresponding one of the plurality of bolts contacting each other inside a first of the plurality of holes;
changing an amount of force applied to the pressure foot through the rod via changing a first distance that the corresponding one of the plurality of bolts extends into the first of the plurality of holes;
removing the rod from the first of the plurality of holes;
removably attaching the rod into a second hole in the plurality of holes such that the rod is in contact with a second one of the plurality of bolts inside the second hole; and
adjusting a second distance that the second one of the plurality of bolts extends into the second hole, thereby adjusting an amount of pressure applied by the pressure foot through the rod.

4. A method for aligning panels while manufacturing an aircraft, the method comprising:
bringing together a first skin panel and a second skin panel;
setting a height of a pair of rails above a surface of the first skin panel via:
connecting an indexing device to the pair of rails via sliding projections extending from opposing ends of a cross beam of the indexing device, respectively, into a groove within each rail of the pair of rails; and
setting a height above the surface of the first skin panel for the pair of rails via:
rotating the cross beam until an indexing foot at an end of a leg extending from the cross beam contacts the surface of the first skin panel at a first desired location, such that the leg stands normal to the surface of the first skin panel;
pivoting the leg away from the first skin panel and sliding the indexing device along a length of the pair of rails; and
rotating the cross beam until the indexing foot contacts the surface of the first skin panel at a second desired location, such that the leg stands normal to the surface of the first skin panel;
attaching the pair of rails to the surface of the first skin panel after setting the height of the rails above the first skin panel;
applying a backing force to the second skin panel; and
pivoting a housing until a pressure foot connected to the housing applies a pressure against the surface of the first skin panel against the backing force, the housing, located between the pair of rails, comprising a first end and a second end opposite each other and being pivotally and slidably connected to the grooves in the pair of rails between facing inside surfaces of the pair of rails such that the housing is pivotable about a first axis defined between the facing inside surfaces of the pair of rails and through the housing.

5. The method of claim 4, further comprising the first desired location comprising a mark for a hole to be drilled through the first skin panel.

6. The method of claim 4, further comprising the indexing foot comprising a hole for aligning the indexing foot at the first desired location.

7. The method of claim 4, further comprising attaching the pair of rails to the surface of the first skin panel via vacuum sealing flanges connected to the pair of rails.

8. A method for manufacturing an aircraft, the method comprising:
    using a tool that comprises:
    a pair of rails that comprise a first rail and a second rail, such that a length of the first rail extends substantially parallel to a length of the second rail, and the pair of rails attach to an inside surface of a first skin panel;
    the first rail comprising a substantially flat surface;
    the second rail comprising an opposing substantially flat surface that faces, and is substantially parallel to, the substantially flat surface of the first rail;
    a first groove in the first rail, the first groove extending along, and substantially parallel to, the length of the first rail;
    a second groove in the second rail, the second groove extending along, and substantially parallel to, the length of the second rail; and
    a housing pivotally and slidably connected to the pair of rails, the housing located between the pair of rails, the housing comprises:
        a first end, a second end opposite to the first end, and a peripheral surface extending between the first end and the second end;
        the first end comprises a first planar surface and a first hole configured to receive a rod;
        the second end comprises a second planar surface and a second hole configured to receive a bolt, the first planar surface being substantially parallel to the second planar surface, such that the first hole aligns, along a central axis substantially perpendicular to the first planar surface and the second planar surface, with the second hole, the substantially flat surface of the first rail separated from the opposing substantially flat surface of the second rail by a distance greater than a length of the second planar surface; and
        first and second indexing protrusions slidably connected to the first groove and the second groove, respectively, such that the housing pivots about a first axis that passes:
            through the first groove and the second groove, substantially perpendicular to the length of the first rail;
            through the housing; and
            slides along the first groove and the second groove;
    the rod comprising a third end and a fourth end, the third end attached to and extending from the first end of the housing; and
    a pressure foot attached to the fourth end of the rod, such that the pressure foot comprises a curved portion integrally formed with a flat flange, such that the curved portion curves into the flat flange, and wherein the pressure foot is configured to apply pressure along a portion of the inside surface of the first skin panel responsive to a central axis of the housing being substantially perpendicular to the inside surface of the first skin panel;
    bringing together the first skin panel and a second skin panel;
    attaching the pair of rails to the inside surface of the first skin panel;
    applying a backing force to the second skin panel; and
    pivoting the housing until the pressure foot applies a pressure against the inside surface of the first skin panel against the backing force.

9. The method of claim 8, wherein the pair of rails further comprises:
    a plurality of feet attached to the pair of rails, the plurality of feet comprising a corresponding plurality of vacuum cups disposed, respectively, on ends of the plurality of feet.

10. The method of claim 8, further comprising: attaching a plurality of hooks and lines to stringers or frame members of the inside surface of the first skin panel.

11. The method of claim 8, further comprising the pair of rails extending along a second axis that is about perpendicular to the first axis.

12. The method of claim 8, further comprising a hole disposed inside the flat flange of the pressure foot, the hole receiving a drill bit driven from an opposite side of the first skin panel.

13. The method of claim 8, further comprising the flat flange of the pressure foot further comprising:
    a first portion integrally formed with the curved portion of the pressure foot; and
    a second portion connected to the first portion only by an elastic member such that the second portion bends towards the housing when the housing is pivoted against the inside surface of the first skin panel.

14. The method of claim 13, further comprising the elastic member comprising a pair of springs.

15. The method of claim 8, further comprising the rod comprising a cross section in a shape selected from the group consisting of: a square, a circle, a star, and an irregular shape.

16. The method of claim 8, further comprising:
    the housing comprising a first plurality of holes disposed on the second planar surface of the housing, the second hole being one of the first plurality of holes; and
    selectively extending the bolt into any one of the first plurality of holes.

17. The method of claim 16, further comprising:
    the bolt being threaded; and
    selectively screwing the bolt into the any one of the first plurality of holes.

18. The method of claim 17, further comprising:
    the first plurality of holes extending entirely through the housing and comprising openings on the first planar surface;
    removably attaching the rod at the first end of the housing in a same hole, of the first plurality of holes, in which the bolt is threaded; and
    changing an amount of force applied to the pressure foot through the rod, via changing a distance that the bolt extends into the same hole, via the rod being removably attached in the same hole in which the bolt is threaded, the bolt and the rod contacting each other inside the same hole.

19. The method of claim 17, further comprising:
the housing comprising a second plurality of holes disposed on the first end of the housing and arranged along the first axis, the first hole being one of the second plurality of holes; and
removably attaching the rod to any one of the second plurality of holes.

20. The method of claim 17, further comprising:
attaching, substantially parallel to the rod, a second rod to the housing, the second rod attached to the pressure foot and extending to at least the second end of the housing; and
applying additional pressure to the pressure foot through the second rod via applying additional pressure to a handle attached to the second rod.

\* \* \* \* \*